(12) United States Patent
Miyamaru et al.

(10) Patent No.: US 7,809,577 B2
(45) Date of Patent: Oct. 5, 2010

(54) APPARATUS FOR SIMULATING THE OPERATION OF A VEHICLE

(75) Inventors: Yukio Miyamaru, Saitama (JP); Sadanao Ichimi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1349 days.

(21) Appl. No.: 11/094,287

(22) Filed: Mar. 31, 2005

(65) Prior Publication Data
US 2005/0182632 A1 Aug. 18, 2005

(30) Foreign Application Priority Data
Apr. 1, 2004 (JP) ............................. 2004-108949

(51) Int. Cl.
*G10L 21/00* (2006.01)
(52) U.S. Cl. ...................... 704/272; 704/275
(58) Field of Classification Search ................ 704/272, 704/275; 482/8, 9, 57
See application file for complete search history.

(56) References Cited

U.S. PATENT DOCUMENTS

| | | | | |
|---|---|---|---|---|
| 5,240,417 | A * | 8/1993 | Smithson et al. ............... | 434/61 |
| 5,953,692 | A * | 9/1999 | Siegel ............................ | 704/1 |
| 6,034,594 | A * | 3/2000 | Gray ........................... | 340/440 |
| 6,053,736 | A | 4/2000 | Huffman et al. | |
| 6,126,306 | A * | 10/2000 | Ando .......................... | 708/605 |
| 6,227,863 | B1 * | 5/2001 | Spector ....................... | 434/167 |
| 6,230,140 | B1 * | 5/2001 | Severson et al. ............ | 704/278 |
| 6,336,891 | B1 * | 1/2002 | Fedrigon et al. .............. | 482/8 |
| 6,415,061 | B1 * | 7/2002 | Benayoun et al. ........... | 382/253 |
| 6,749,432 | B2 * | 6/2004 | French et al. ................. | 434/247 |

(Continued)

FOREIGN PATENT DOCUMENTS
EP 1 262 955 A2 12/2002

(Continued)

OTHER PUBLICATIONS eDimensional—3D Glasses and Virtuual Reality Accessories: Voice Recognition, Available from http://www.edimensional.com/category_reviews.php?cpath=23 (Jun. 1, 2005).

(Continued)

*Primary Examiner*—Michael N Opsasnick
(74) *Attorney, Agent, or Firm*—Birch, Stewart, Kolasch & Birch, LLP

(57) ABSTRACT

To eliminate a wrong recognition of speech and reduce processing load to be applied to a computer in a simulation apparatus. The simulation apparatus includes a speech recognition section for referring to dictionary data in which a plurality of phrase data are recorded to specify phrase data, a dictionary selection section for selecting the dictionary data to be referred to by the speech recognition section in response to a mode, and a monitor and a motor for being operated based on an operation of rider, speech and the phrase data. The speech recognition section confirms whether or not sound inputting is valid. If the sound inputting is valid, then a speech recognition mark is displayed on a screen. One of the dictionary data is selected based on the mode. Voice of the rider and the dictionary data are referred to for searching for phrase data conforming to the recognized speech.

18 Claims, 29 Drawing Sheets

U.S. PATENT DOCUMENTS

| | | | |
|---|---|---|---|
| 6,902,513 B1 * | 6/2005 | McClure | 482/8 |
| 7,090,619 B2 * | 8/2006 | Miyamaru et al. | 482/57 |
| 7,194,347 B2 * | 3/2007 | Harumoto et al. | 701/45 |
| 7,319,992 B2 * | 1/2008 | Gaos | 706/62 |
| 2002/0068499 A1 * | 6/2002 | Huntsberger et al. | 446/93 |
| 2003/0171190 A1 * | 9/2003 | Rice | 482/57 |

FOREIGN PATENT DOCUMENTS

| | | |
|---|---|---|
| GB | 2 351 627 A | 1/2001 |
| JP | 55-6307 A | 1/1980 |
| JP | 8-297497 A | 11/1996 |
| JP | 2002-263232 A | 9/2002 |
| JP | 2002-360931 A | 12/2002 |
| JP | 2003-148987 A | 5/2003 |
| WO | WO-01/70340 A2 | 9/2001 |

OTHER PUBLICATIONS

Freeware.de:Flight Assistant, Available from http://www.freeware.de/Windows/Games_Fun/Simulationen/Flugsimulatoren/DetailEN_Flight_Assistant_10433.thml (Nov. 3, 2003).

* cited by examiner

| COMMAND | PROCESS |
|---|---|
| UPPER<br>LOWER<br>MAKE HEAVIER<br>MAKE LIGHTER<br>⋮ | BIRD'S EYE VIEW DISPLAY<br>RIDER'S EYE VIEW DISPLAY<br>INCREASE OF THE LOAD AND INCREASE OF THE VELOCITY COEFFICIENT<br>DECREASE OF THE LOAD AND DECREASE OF THE VELOCITY COEFFICIENT<br>⋮ |
| BIRD'S EYE VIEW<br>RIDER'S EYE VIEW<br>SHIFT-UP<br>SHIFT-DOWN<br>⋮ | BIRD'S EYE VIEW DISPLAY<br>RIDER'S EYE VIEW DISPLAY<br>INCREASE OF THE LOAD AND INCREASE OF THE VELOCITY COEFFICIENT<br>DECREASE OF THE LOAD AND DECREASE OF THE VELOCITY COEFFICIENT<br>⋮ |
| LEFT<br>RIGHT<br>⋮ | LEFTWARD SCREEN DISPLAY<br>RIGHTWARD SCREEN DISPLAY<br>⋮ |

FIG.12

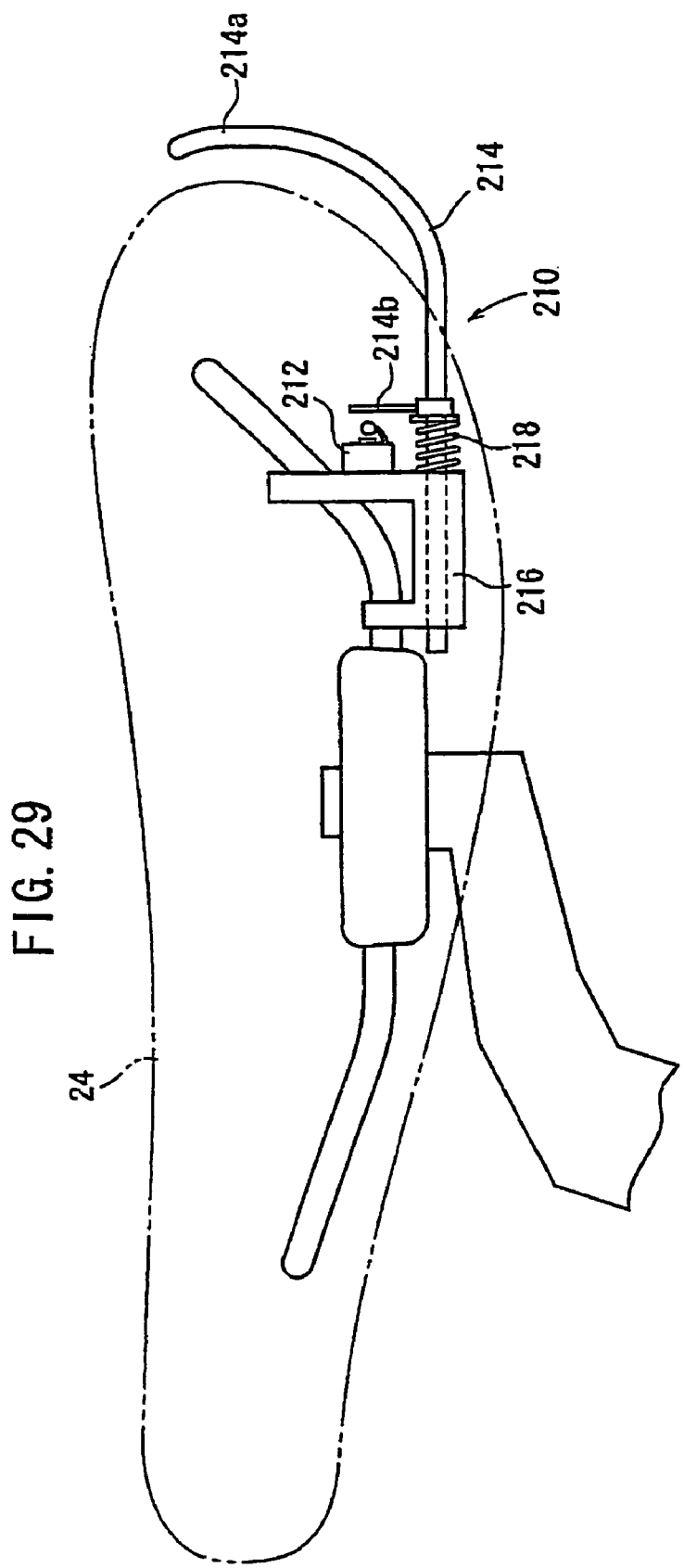

APPARATUS FOR SIMULATING THE OPERATION OF A VEHICLE

CROSS-REFERENCE TO RELATED APPLICATIONS

The present application claims priority under 35 USC 119 to Japanese Patent Application No. 2004-108949 filed on Apr. 1, 2004 the entire contents of which are hereby incorporated by reference.

BACKGROUND OF THE INVENTION

1. Field of the Invention

This invention relates to a simulation apparatus used for such applications such as traffic safety education, games, training and so forth.

2. Description of Background Art

For a simulated experience of the operation of an airplane, an automobile, a motorcycle, a bicycle and so forth, various simulation apparatus have been proposed that individually correspond to a particular vehicles and have been partly placed into practical use.

A simulation apparatus sometimes executes a command for changing a mode, for changing a display method of a monitor and so forth in addition to the original operations of a vehicle. When a simulation apparatus is operated, preferably a user is absorbed in the original operations of the vehicle as far as possible. Therefore, in the execution of a command described above, preferably a speech command to be executed through speech recognition is used to avoid the use of the hands and the feet. From such a background as just described, a simulator which detects particular phrase data registered in advance by means of a speech recognition apparatus has been proposed. See, Japanese Patent Laid-Open No. Sho 55-6307.

While a simulation apparatus includes a computer for the control use, if processes for speech recognition are performed in addition to the control of a vehicle, then the processing load applied to the computer is increased. To incorporate a computer that is ready for such an increased processing load requires an increase in the cost. Further, the control of a vehicle exhibits different processing loads depending upon the situation on the simulated operation such as an operation mode, and when the load is light, the computer sometimes indicates an excessive capacity.

On the other hand, where a large number of commands are prepared, the data amount of the phrase data corresponding to them is great. Accordingly, the computer is obliged to access the large amount of data, which gives rise to a drop in the processing speed. Further, as the data amount of phrase data increases, the possibility that analogous data may be present increases, resulting in the possibility that a wrong recognition of the phrase data may occur.

SUMMARY AND OBJECTS OF THE INVENTION

The present invention has been made taking the subject matter described above into consideration. It is an object of the present invention to provide a simulation apparatus including a speech recognition apparatus which can eliminate the wrong recognition of speech and reduce a processing load to be applied to a computer and so forth.

A simulation apparatus according to the present invention includes the simulation apparatus with a simulated vehicle for being operated by a driver, a speech recognition section for recognizing speech of the driver, and an outputting section for performing a predetermined outputting based on the operation and the speech of the driver. The speech recognition section automatically starts or stops the recognition of speech in response to a situation on simulated driving.

Where the speech recognition section automatically starts or stops the recognition of speech in this manner, the processing load to be applied to a processing section such as a computer can be suppressed to prevent a drop of the processing speed, and reduction of the cost of the simulation apparatus can be anticipated.

In this instance, if the simulation apparatus further includes an indicator for indicating an operation state of the speech recognition section, then the driver can confirm the validity or invalidity of the speech recognition section at the point in time at a glance and can issue an instruction by voice at an appropriate timing.

Further, another simulation apparatus according to the present invention includes the simulation apparatus with a simulated vehicle for being operated by a driver, a plurality of dictionary data in each of which a plurality of phrase data are recorded, a speech recognition section for referring to the dictionary data based on speech of the driver to specify the phrase data, an outputting section for performing predetermined outputting based on the operation and the phrase data of the driver, and a dictionary selection section for selecting one of the dictionary data to be referred to by the speech recognition section in response to a situation on simulated driving.

When a plurality of dictionary data are provided and the dictionary data are selected in response to a situation in this manner, the amount of data to be referred to by a processing section such as a computer decreases and the processing load to be applied to the processing section decreases. Accordingly, the processing speed of the processing section is raised, and a reduction of the cost of the system is achieved by the use of a processing section suitable for the low processing load. Further, since the dictionary data are different among different situations on the simulated operation, the presence of a plurality of analogous phrase data analogous in one dictionary data is avoided, and wrong recognition of speech is prevented and the accuracy in recognition is enhanced.

In this instance, the simulated vehicle may be a simulated bicycle which includes a pair of cranks each having a pedal at an end thereof and connected to the left and right of a crankshaft, and a handlebar mounted for leftward and rightward pivotal motion. Since a bicycle is a vehicle which is operated by both a child and an adult, whereby providing a child dictionary and an adult dictionary separately, the speech recognition section is effective particularly for a simulation apparatus for a bicycle.

With the simulation apparatus according to the present invention, since the speech recognition section automatically starts or stops the recognition of speech in response to a situation, the processing load applied to a processing section such as a computer can be suppressed, and a drop in the processing speed can be prevented. Further, since a plurality of dictionary data are provided and the dictionary data are selected in response to the situation, the amount of data to be referred to by the processing section such as a computer can be reduced to reduce the processing load to be applied to the processing section. Accordingly, the processing speed of a computer or the like is increased. When a processing section suitable for a low processing load is used, a reduction in cost of the system can be anticipated.

Further, since the dictionary data are different among different situations on the simulated operation, the presence of a plurality of analogous phrase data in one dictionary data is avoided, and a wrong recognition of speech is prevented and the accuracy in recognition is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed-description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 12 is a diagrammatic view illustrating contents of in-city traveling dictionary data;

FIG. 29 is a schematic side elevational view of a modification to a grip detection section.

DETAILED DESCRIPTION OF THE PREFERRED EMBODIMENTS

In the following, an embodiment of a simulation apparatus according to the present invention is described with reference to FIGS. 1 to 29 of the accompanying drawings.

Figure 1:
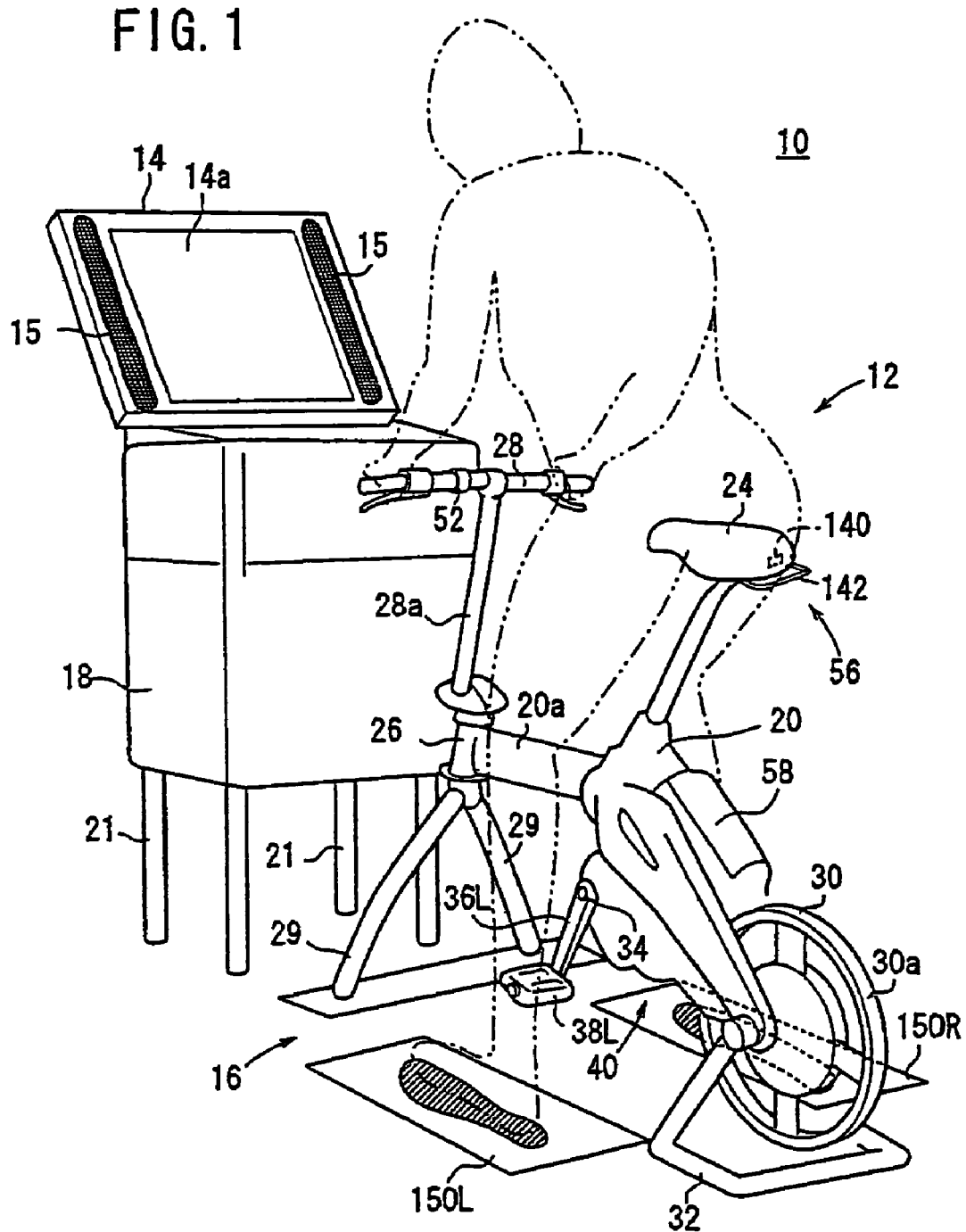
FIG. 1 is a perspective view of a simulation apparatus according to an embodiment.

As shown in FIG. 1, the simulation apparatus 10 according to the present embodiment is a simulation apparatus of a bicycle and includes a simulated bicycle (simulated vehicle) 12, and a monitor (outputting section) 14 for displaying a scene in accordance with the riding of the simulated bicycle 12 on a screen 14a. The simulation apparatus 10 further includes a speaker 15 for issuing a speech instruction to the rider and for generating simulated sound. A mat switch 16 is provided at a position at which the drivers gets on and off the simulated bicycle. A main control section 18 is provided for generally controlling the simulation apparatus 10. The main control section 18 is disposed forwardly of the simulated bicycle 12, and the monitor 14 and the speaker 15 are disposed at positions above the main control section 18 at which they can be easily observed by the rider on the simulated bicycle 12.

Figure 10:
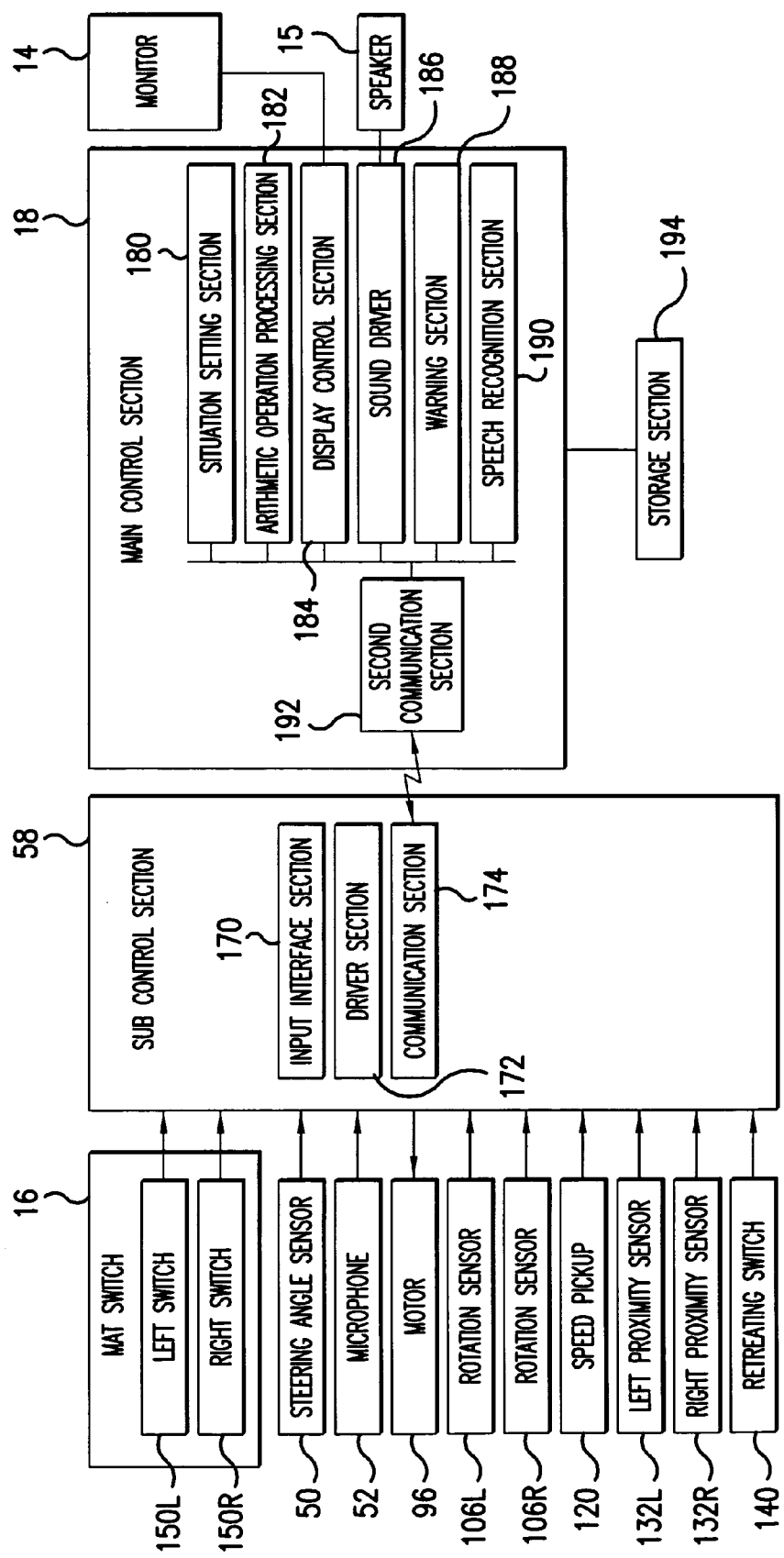
FIG. 10 is a block diagram of an electric configuration of the simulation apparatus.

The screen 14a of the monitor 14 displays a speech recognition mark 19 (refer to FIG. 14) as an indicator for indicating that the speech recognition process is valid under the action of the speech recognition section 190 (refer to FIG. 10). The speech recognition mark 19 is formed from a mark representative of the shape of a microphone and a character string of "microphone on." The main control section 18, monitor 14 and speaker 15 are supported for upward and downward movement by four support posts 21 so that the positions thereof can be adjusted in accordance with the physique of the rider. The monitor 14 may be a monitor of a small size which is provided, for example, at an upper portion of a handlebar 28.

The simulated bicycle 12 is hereinafter described. In the following description, mechanisms which are provided one by one on the left and right of the simulated bicycle 12 are denoted distinctly such that "L" is added to a reference number for left mechanisms while "R" is added to the reference number for right mechanisms.

The simulated bicycle 12 includes a frame 20, a saddle (seat) 24 connected to the frame 20 through a seat pillar, a handlebar 28 mounted for pivotal motion on a head tube 26 of the frame 20, and two front forks 29 serving as stands for fixedly supporting the head tube 26 thereon. The simulated bicycle 12 further includes a flywheel 30 made of iron and provided at a rear end portion of the frame 20, and a back stand 32 for supporting the frame 20 such that the flywheel 30 is spaced away from the floor. The saddle 24 and the handlebar 28 can be adjusted in a vertical position in conformity with the physique of the rider.

Figure 2:
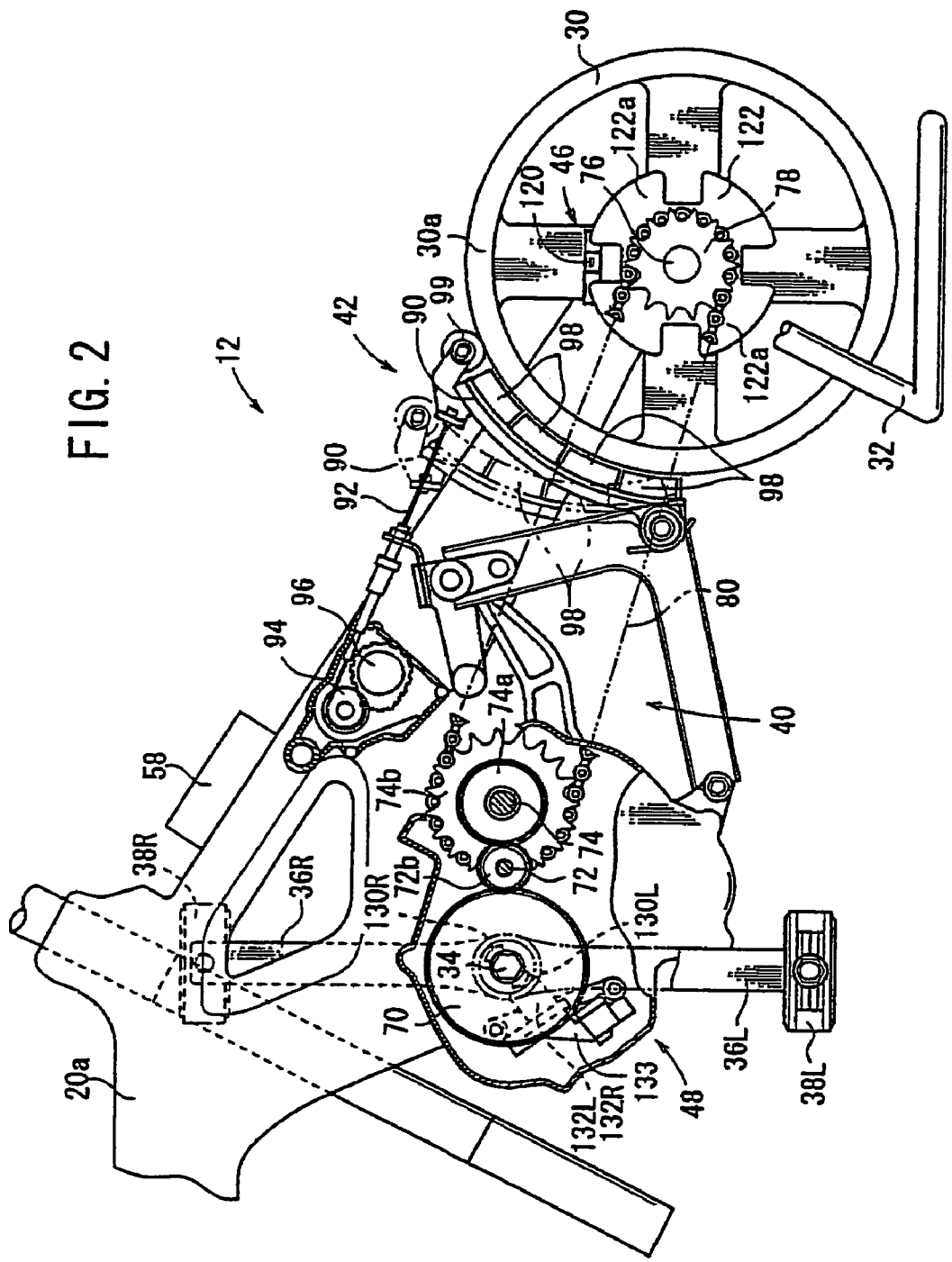
FIG. 2 is an enlarged side elevational view, partly in section, of a simulated bicycle.
Figure 4:
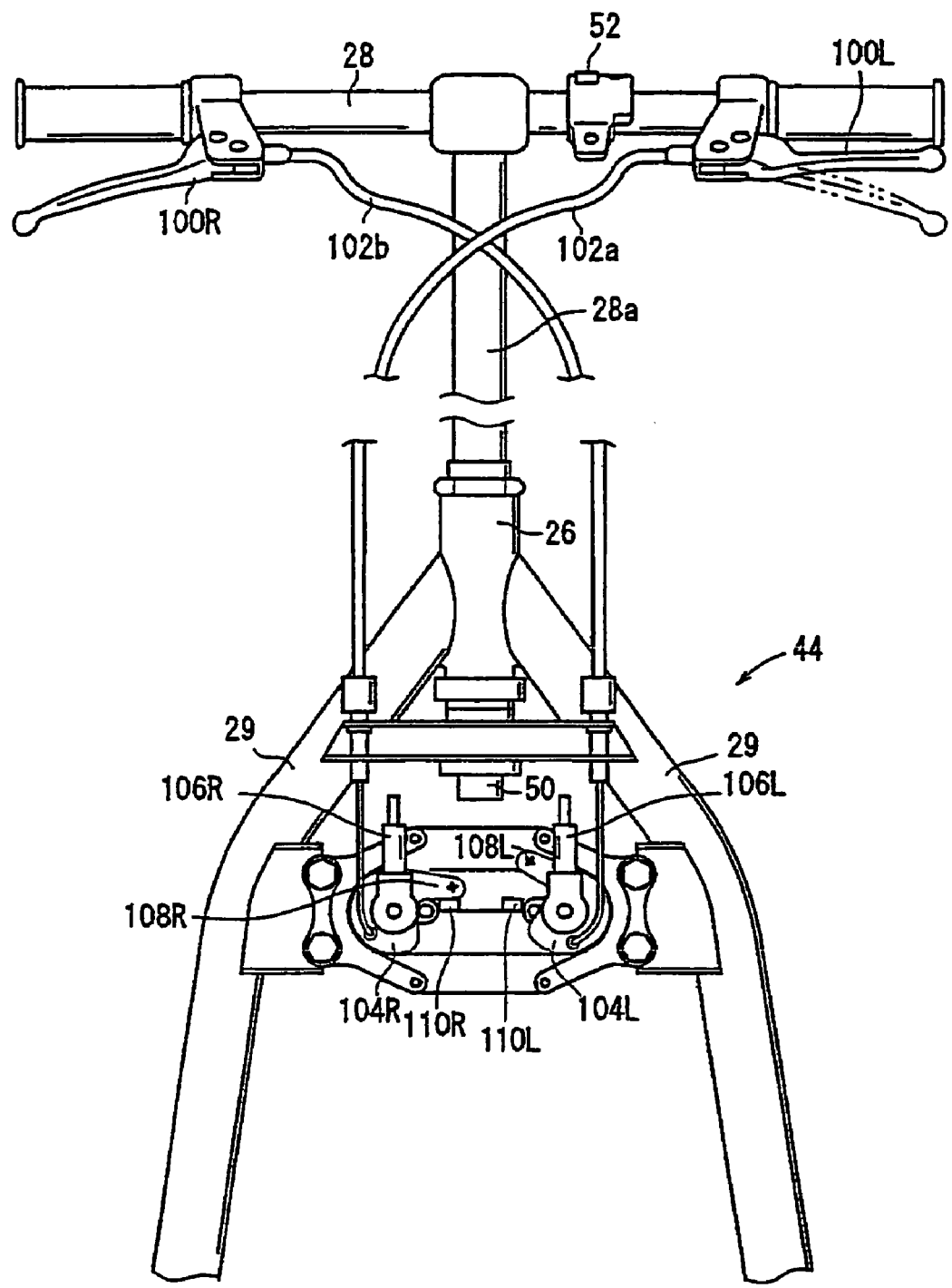
FIG. 4 is a front elevational view of the simulated bicycle.

As shown in FIGS. 1, 2 and 4, the simulated bicycle 12 includes a pair of cranks 36L and 36R connected to the left and right of a crankshaft 34, pedals 38L and 38R provided at ends of the cranks 36L and 36R, and a driving force transmission section 40 for transmitting rotation of the crankshaft 34 to the flywheel 30.

Further, the simulated bicycle 12 includes, as electric mechanisms, a load section 42 for applying load to the flywheel 30, a braking instruction section 44 for braking the flywheel 30, and a speed detection section 46 for detecting the speed of rotation of the flywheel 30. The simulated bicycle 12 further includes, a crank position detection section 48 for detecting the rotational positions of the cranks 36L and 36R, a steering angle sensor 50 (refer to FIG. 4) for detecting a steering angle $\theta_H$ of the handlebar 28, a microphone 52 for inputting the voice of the rider, and a grip detection section 56 provided at a rear lower portion of the saddle 24. Further, a sub-control section 58 for receiving signals from the electric mechanism mentioned above and performing predetermined control is provided for the simulated bicycle 12, and the sub-control section 58 and the main control section 18 can perform real-time mutual communication therebetween.

Figure 3:
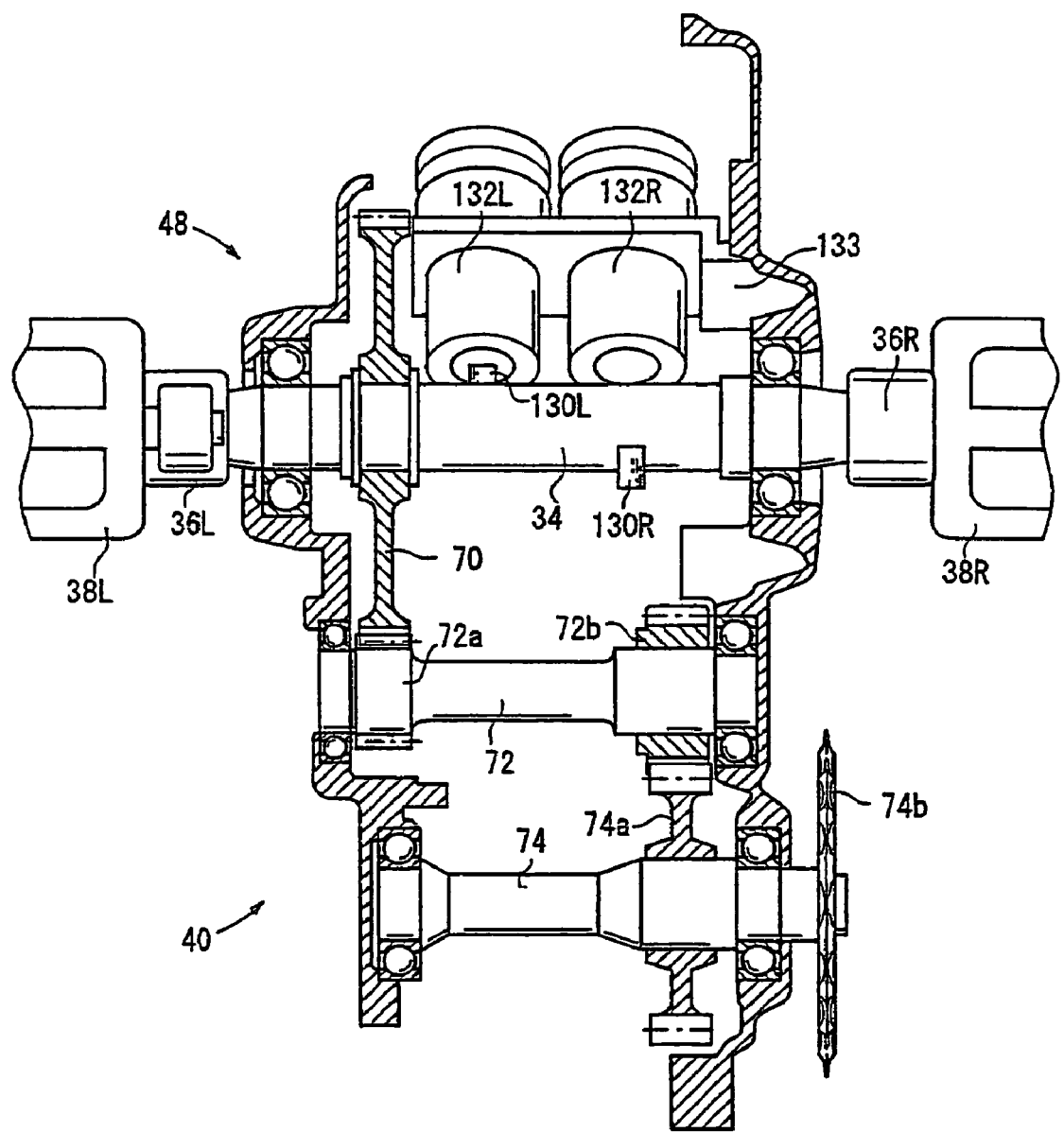
FIG. 3 is a plan view, partly in section, of a driving force transmission section.

As shown in FIGS. 2 and 3, the driving force transmission section 40 includes a driving gear 70 provided on the crankshaft 34, a first intermediate shaft 72 having a driven gear 72a and a driving gear 72b, and a second intermediate shaft 74 having a driven gear 74a and a driving sprocket wheel 74b. The driving gear 70 is held in meshing engagement with the driven gear 72a while the driving gear 72b is held in meshing engagement with the driven gear 74a. Consequently, the second intermediate shaft 74 receives and is rotated by a driving force of the crankshaft 34 through the first intermediate shaft 72.

The driving force transmission section 40 further includes a free hub 76 for supporting the flywheel 30, a driven sprocket wheel 78 provided on the free hub 76, and a chain 80 for transmitting a driving force of the driving sprocket wheel 74b to the driven sprocket wheel 78. The crankshaft 34, first intermediate shaft 72 and second intermediate shaft 74 are each supported for rotation by two bearings. The free hub 76 has a bearing built therein.

The free hub 76 transmits only rotational driving force in the forward direction of the driven sprocket wheel 78 to the flywheel 30 by means of a one-way clutch mechanism provided therein. Accordingly, when the crankshaft 34 rotates in the opposite direction, or when rotation of the crankshaft 34 stops while the flywheel 30 is rotating in the forward direction, the flywheel 30 maintains its rotational state (rotation in the positive direction or stopping) at the point in time irrespective of the crankshaft 34.

The load section 42 includes an arcuate load plate 90 supported at an end thereof for pivotal motion on the frame 20 with a pull cable 92 connected to the other end of the load plate 90. A drum 94 is provided for taking up the pull cable 92. A motor (outputting section) 96 is provided for driving the drum 94 to rotate. The load plate 90 has a plurality of ferrite magnets 98 adhered thereto that are concentrically arranged with the flywheel 30 in an opposing relationship to a rim 30a on the outer periphery of the flywheel 30. The load plate 90 is biased to tilt toward the flywheel 30 by a torsion spring, and when it is not pulled by the pull cable 92, a roller 99 provided at the other end of the load plate 90 contacts with and is rotated by the rim 30a. At this time, the ferrite magnets 98 and the rim 30a come very close to each other, and when the flywheel 30 rotates, eddy current flows in the rim 30a to generate eddy-current loss, whereby a load can be applied to the flywheel 30. Since load is applied by eddy current, a quiet operation with minimum mechanical noise can be achieved.

Further, when the pull cable 92 is taken up under the action of the motor 96, the load plate 90 is tilted to space the ferrite magnets 98 away from the rim 30a. Accordingly, the load to the flywheel 30 can be adjusted under the action of the motor 96, and when the load plate 90 is displaced the farthest away from the rim 30a, the load is substantially equal to zero. The load to the flywheel 30 by the load section 42 acts also as a braking force, and the load section 42 serves also as a braking means. Since the load section 42 does not include a sliding portion for braking, the exchange of parts such as a brake pad which are required by a type wherein the load is generated by a mechanical braking is unnecessary.

Further, when the estimated transmission gear ratio is high and the pedals 38L and 38R are being pedaled, it is possible to cause the rider to feel a heavy operation of the pedals 38L and 38R by moving the load plate 90 toward the rim 30a, and a simulated gear change can be performed. In this instance, when the pedals 38L and 38R are not being pedaled, the load plate 90 should be spaced away from the rim 30a so that an unnatural braking may not be performed. Whether or not the pedals 38L and 38R are being pedaled can be decided based on signals obtained from a left proximity sensor 132L and a right proximity sensor 132R.

As shown in FIG. 4, the braking instruction section 44 includes two brake levers 100L and 100R provided on the handlebar 28 with brake wires 102a and 102b extending from the handlebar 28 to the front forks 29. Resiliently rotatable pulleys 104L and 104R are provided together with rotation sensors 106L and 106R. The brake wire 102a and the brake wire 102b intermediately cross each other and are connected at the opposite ends thereof to the brake levers 100L and 100R and the pulleys 104R and 104L, respectively.

The pulleys 104L and 104R are resiliently biased by springs (not shown) such that, when the brake levers 100L and 100R are not pulled, projections 108L and 108R thereof are directed upwardly. At this time, the brake levers 100L and 100R are resiliently biased by the pulleys 104L and 104R and spaced away from the handlebar 28.

If the brake levers 100L and 100R are pulled towards the handlebar 28, then the pulleys 104L and 104R are rotated resiliently until the projections 108L and 108R are directed downwardly. The pulleys 104L and 104R can rotate until the projections 108L and 108R are contacted with stops 110L and 110R, respectively.

The angles of rotation of the pulleys 104L and 104R can be detected by the rotation sensors 106L and 106R, respectively, and the detected angle signals are supplied to the sub-control section 58. The sub-control section 58 controls the load section 42 based on the detected rotational angle signals of the pulleys 104L and 104R, that is, signals corresponding to the amounts of operation (hereinafter referred to as a braking operation) of the brake levers 100L and 100R, to apply a braking force to the flywheel 30. For example, the load plate 90 is moved towards the flywheel 30 in proportion to a sum value of the rotational angle of the pulley 104L and the rotational angle of pulley 104R to increase the load such that, when the sum value indicates a maximum value, the load plate 90 is positioned nearest to the flywheel 30. When no braking operation is performed, the load plate 90 is spaced most away from the flywheel 30 to reduce the load to substantially zero.

In the braking instruction section 44, since a braking operation is converted into electric signals by the rotation sensors 106L and 106R, the operational amount of the braking operation can be recognized by the sub-control section 58. Thus, the braking instruction section 44 can perform elaborate processing or adjustment corresponding to the operational amount, and the load section 42 which is driven electrically can be used also as a brake.

Further, as shown in FIG. 4, the steering angle sensor 50 is provided at a lower end portion of the head tube 26 and detects a pivotal angle of a stem 28a which supports the handlebar 28 thereon. The microphone 52 is provided on the handlebar 28, and since the microphone 52 is positioned nearly to the face of the rider, the voice of the rider is inputted clearly to the microphone 52. The steering angle sensor 50 and the microphone 52 are connected to the sub-control section 58 and supply an angle signal of a steering angle $\theta_B$ and a speech signal.

Referring back to FIG. 2, the speed detection section 46 includes a speed pickup 120 provided on the frame 20 through a bracket, and a pickup rotor 122 mounted coaxially for integral rotation on the flywheel 30. The pickup rotor 122 has four radial blades 122a, and the speed pickup 120 detects each of the blades 122a passing in front thereof to detect the speed of rotation of the flywheel 30. The flywheel 30 can be regarded as a wheel of an actual bicycle, and by detecting the speed of rotation of the flywheel 30, a simulated riding traveling speed of the simulated bicycle 12 can be detected. A detection signal of the speed pickup 120 is supplied to the sub-control section 58.

Figure 5:
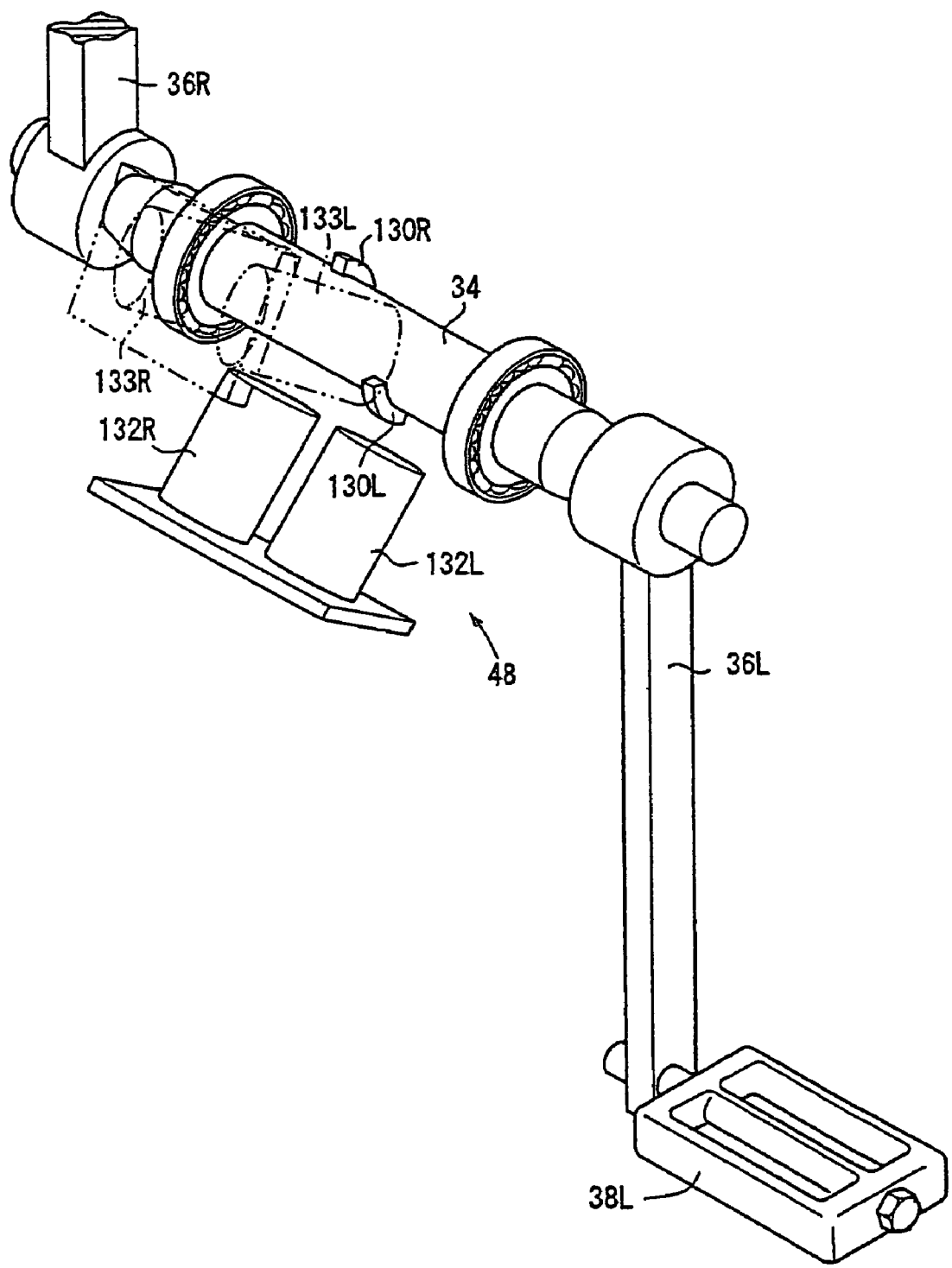
FIG. 5 is a schematic perspective view of the driving force transmission section.

As shown in FIGS. 2, 3 and 5, the crank position detection section 48 has detection object projections 130L and 130R provided at positions leftwardly and rightwardly at equal distances from the center of the crankshaft 34. A left proximity sensor 132L and a right proximity sensor 132R are provided. The left proximity sensor 132L and the right proximity sensor 132R are provided in the proximity of the crankshaft 34 through a stay 133 and are disposed such that the detection object projections 130L and 130R pass in the proximity of the front of detection portions thereof. The left proximity sensor 132L and the right proximity sensor 132R may otherwise be attached directly to the frame 20 or a predetermined casing.

The left proximity sensor 132L and the right proximity sensor 132R are sensors for which, for example, a Hall element is used, and exhibit an on state when the detection object projections 130L and 130R, which are detection objects, are positioned in front of the detection portions thereof, respectively. Since the left proximity sensor 132L and the right proximity sensor 132R are used for the crank position detection section 48, the rotational positions of the cranks can be detected simply and readily with a less expensive configuration.

The detection object projections 130L and 130R are sectoral projections having an angle of 60° and centered at the crankshaft 34. The detection object projections 130L and 130R are attached such that, when the crank 36L is directed downwardly and the crank 36R is directed upwardly, the detection object projection 130L is directed to an angle (hereinafter referred to as reference angle) of 45° in the clockwise direction from the vertically downward direction in FIG. 2 while the detection object projection 130R is directed to another angle of 180° from the reference angle.

The left proximity sensor 132L and the right proximity sensor 132R are provided at positions at which they can detect, at the reference angle thereof, with the detection object projections 130L and 130R, respectively. In particular, when the crankshaft 34 rotates, while the center of the detection object projection 130L is within ±300 with respect to the reference angle, the left proximity sensor 132L exhibits an on state, but exhibits an off state in any other case. On the other hand, when the crankshaft 34, while the center of the detection object projection 130R is within ±30° with respect to the reference angle, the right proximity sensor 132R exhibits an on state, but exhibits an off state in any other case. In other words, the left proximity sensor 132L exhibits an on state when the crank 36L and the pedal 38L are within ±30° with respect to the downward direction, and the right proximity sensor 132R exhibits an on state when the crank 36R and the pedal 38R are within ±30° with respect to the downward direction. On-off signals detected by the left proximity sensor 132L and the right proximity sensor 132R are supplied to the sub-control section 58.

Further, a left proximity sensor 133L for detecting the detection object projection 130L and a right proximity sensor 133R for detecting the detection object projection 130R may be provided at a position of 90° in the clockwise direction from the reference angle as indicated by chain double-dashed lines in FIG. 5. Thus, when the left proximity sensor 133L is on, it can be detected that the crank 36L is directed horizontally forwardly, and when the right proximity sensor 133R is on, it can be detected that the crank 36R is directed horizontally forwardly. Consequently, for example, an image of the crank of the bicycle displayed on the screen 14a and an image of the feet of the rider can be displayed like an animation by varying them stepwise in response to the actual angles of the cranks 36L and 36R, and a more realistic image is obtained.

Figure 6:
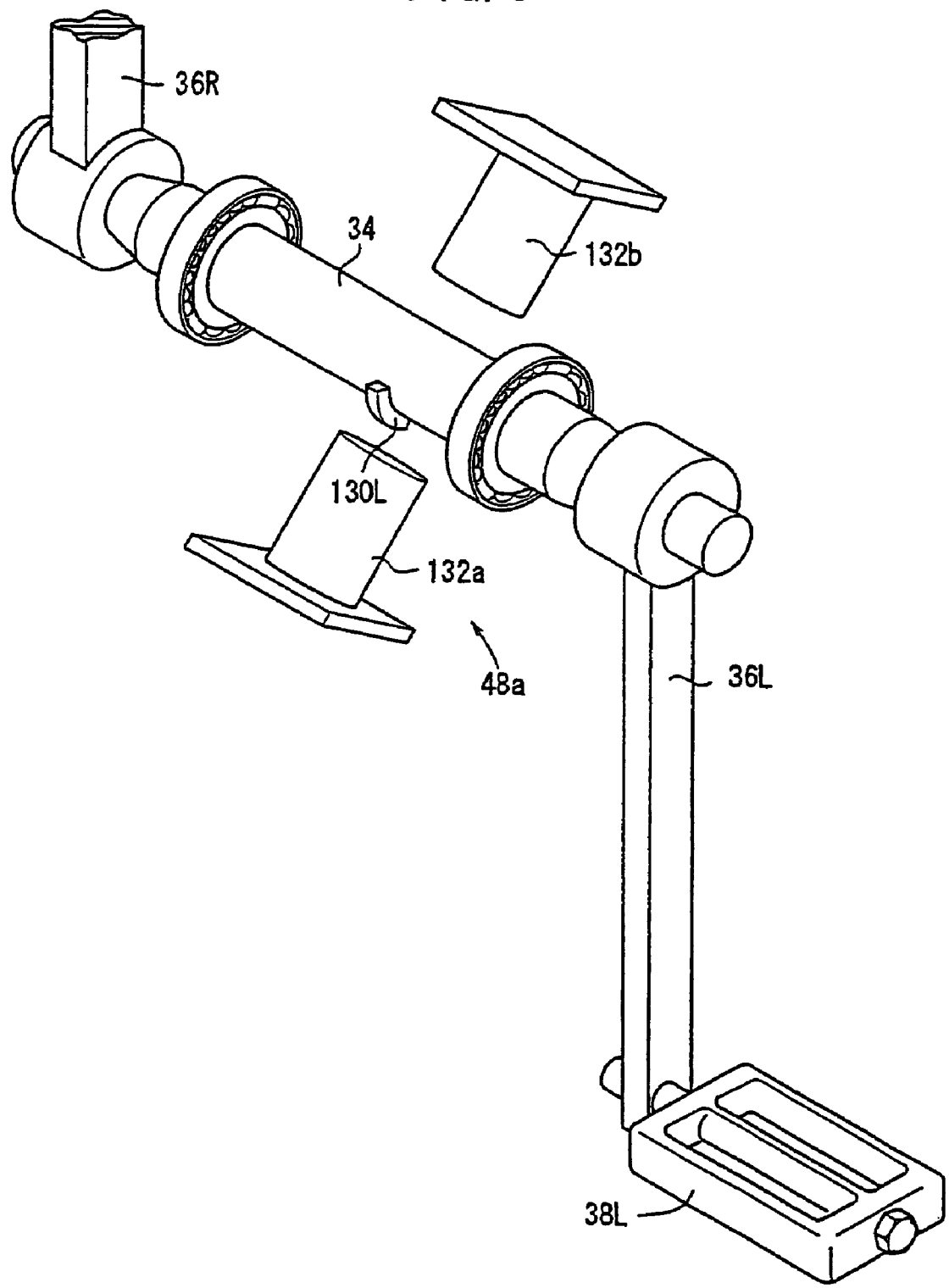
FIG. 6 is a schematic perspective view of a modification to the driving force transmission section.

Further, as shown in FIG. 6, a crank position detection section 48a according to a modification may be configured such that the detection object projection 130R is omitted while one detection object projection 130L and two proximity sensors 132a and 132b are provided such that the proximity sensor 132a and the proximity sensor 132b are disposed on the opposite sides of the crankshaft 34. In this instance, when the proximity sensor 132a which corresponds to the left proximity sensor 132L detects the detection object projection 130L and exhibits an on state, it can be detected that the left crank 36L is directed downwardly, and when the proximity sensor 132b which corresponds to the right proximity sensor 132R detects the detection object projection 130L and exhibits an on state, it can be detected that the crank 36R is directed downwardly. Furthermore, a rotational sensor such as a rotary encoder for detecting the angle of rotation of the crankshaft 34 precisely may be provided as the crank position detection section.

Figure 7:
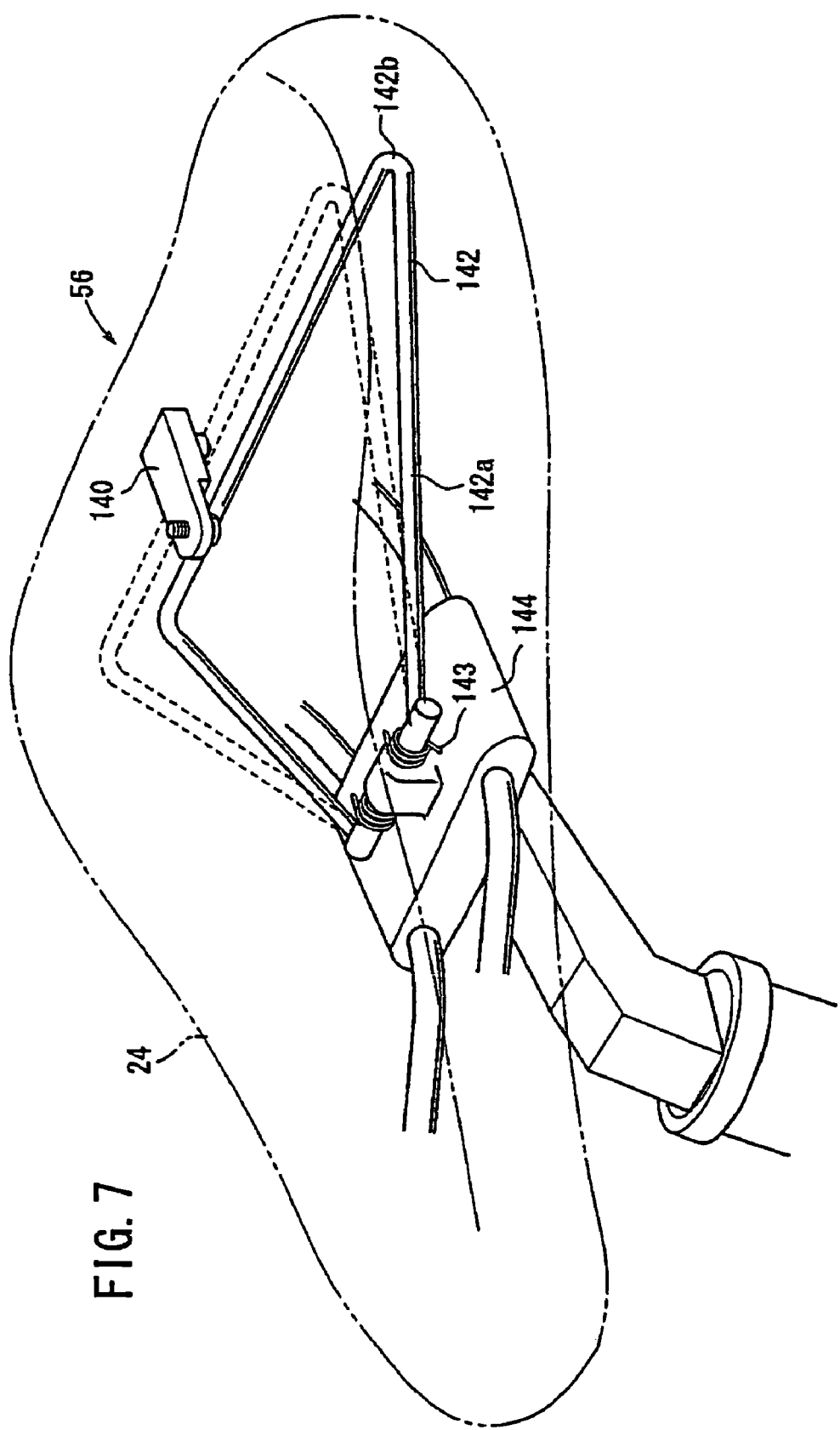
FIG. 7 is a partial perspective view of a saddle.

As shown in FIG. 7, the grip detection section 56 includes a retreating switch 140 in the form of a momentary type limit switch provided at a rear lower portion of the saddle 24, and a lever 142 for operating the retreating switch 140 on and off.

A front portion 142a of the lever 142 is supported for pivotal motion on a suddle support 144 while it is resiliently biased downwardly by a spring 143, and contacts with a predetermined stopper. A rear portion 142b of the lever 142 has a shape of a plate having a width substantially equal to that of a rear portion of the saddle 24 and is disposed below the retreating switch 140. The lever 142 can be operated to be lifted by a hand of a person while being acted upon by suitable reactive force by the spring 143, and can be lifted until the rear portion 142b is brought into contact with the retreating switch 140. As a result, the retreating switch 140 is switched on and supplies the on signal to the sub-control section 58. The lever 142 is operated while the rider is not on the simulation apparatus, and may be operated such that the rear portion 142b and a rear upper portion of the saddle 24 are grasped.

Since the retreating switch 140 is operated via the lever 142, the rider who is not on the simulation apparatus can easily operate the retreating switch 140. Further, since the retreating switch 140 is operated via the lever 142, the rear portion 142b which is an operation portion of the lever 142 can be disposed at a location at which the hand of the rider can reach most readily, and the degree of freedom in selection in design of the size, shape and number of the retreating switch 140 is high.

Since the grip detection section 56 is provided at a rear lower portion of the saddle 24, it does not provide an obstacle when the rider is seated on the saddle 24 and when the rider pedals the pedals 38L and 38R.

Since the retreating switch 140 is operated via the lever 142, the rider who is not on the simulation apparatus can readily operate the retreating switch 140, and the retreating switch 140 itself may be formed from a switch of a small size. Since the grip detection section 56 is provided at a rear lower portion of the saddle 24, it does not provide an obstacle when the rider is seated on the saddle 24.

As shown in FIG. 1, the mat switch 16 is composed of a left switch 150L and a right switch 150R independent of each other and is disposed at a position at which, when the rider gets off the simulation apparatus, the rider can tread the left switch 150L and the right switch 150R with both feet across a front tube 20a of the frame 20. In short, the left foot treads the left switch 150L, and the right foot treads the right switch 150R. When the left switch 150L and the right switch 150R are treaded, they are switched on and supply on signals to the sub-control section 58.

Figure 8:
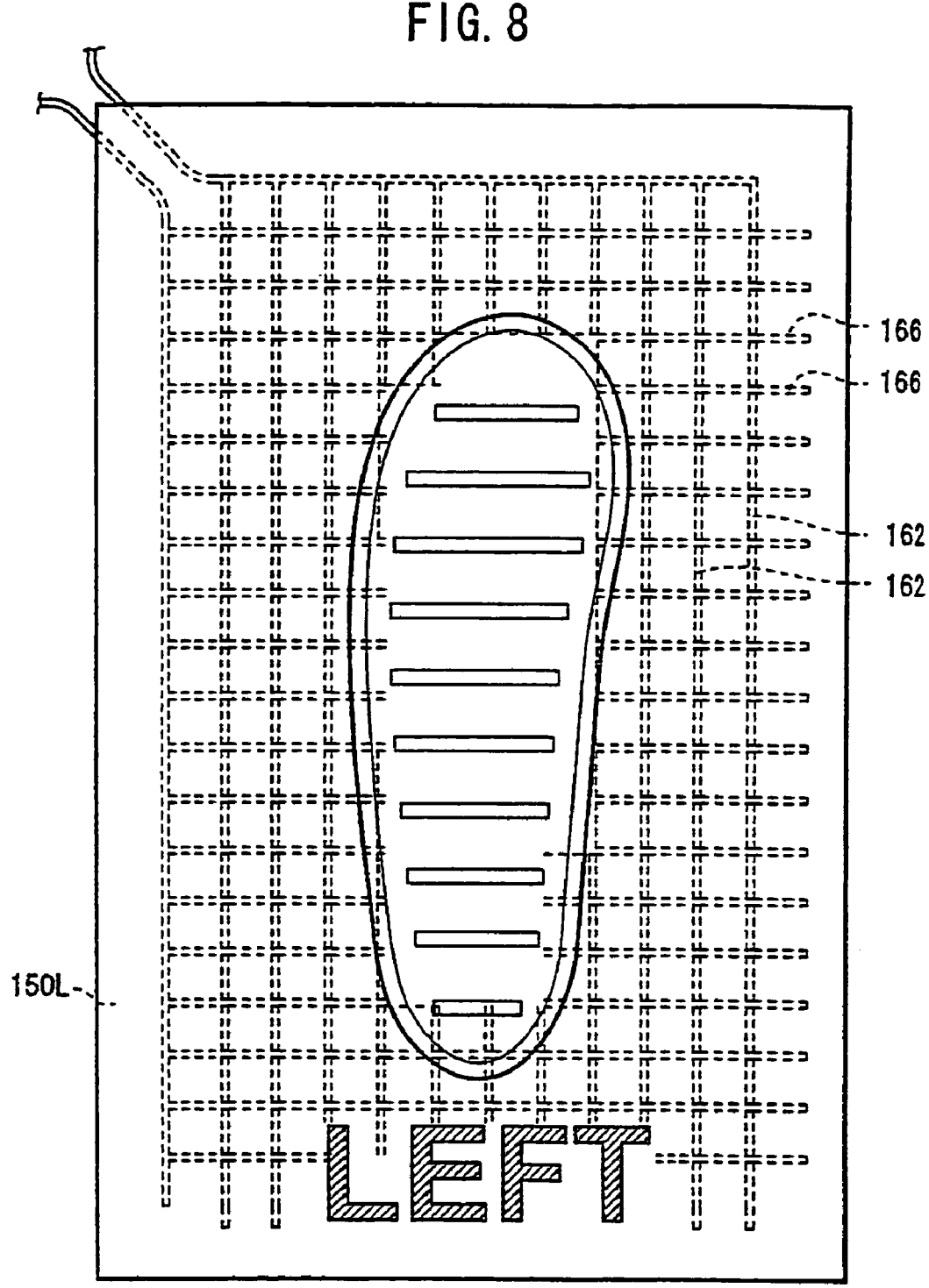
FIG. 8 is a plan view of a left switch.
Figure 9:
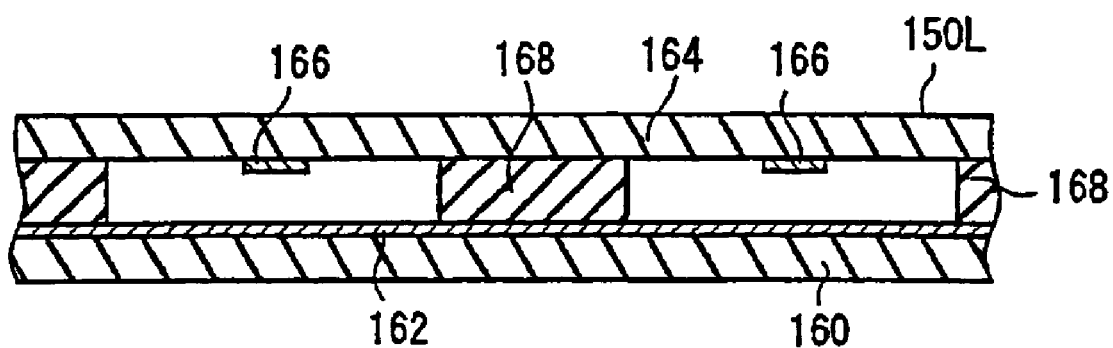
FIG. 9 is a sectional view of the left switch.

As shown in FIGS. 8 and 9, the left switch 150L is in the form of a thin mat and includes a rear face rubber sheet 160, a plurality of longitudinal electrode lines 162 adhered to the rear face rubber sheet 160, a front face rubber sheet 164, transverse electrode lines 166 adhered to the front face rubber sheet 164, and an insulating material 168 provided between the longitudinal electrode lines 162 and the transverse electrode lines 166. Each of the longitudinal electrode lines 162 is connected to one of two terminals (not shown), and each of the transverse electrode lines 166 is connected to the other terminal. The front face rubber sheet 164 and the insulating material 168 are soft and are resiliently deformed when the front face rubber sheet 164 is treaded by an individual's foot, whereupon the longitudinal electrode lines 162 and the transverse electrode lines 166 are contacted with each other at intersecting portions thereof. Consequently, the two terminals are rendered conducting and exhibit an on state. On the other hand, if the foot is released, then the front face rubber sheet 164 and the insulating material 168 restore their original shapes, whereupon the longitudinal electrode lines 162 and the transverse electrode lines 166 are brought out of contact with each other and exhibit an off state. The front face rubber sheet 164 has a shape of the left sole and includes the designation "LEFT" printed thereon. The right switch 150R is same in structure as the left switch 150L and has a shape of the right sole and includes the designation "RIGHT" printed on the surface thereof.

While the left switch 150L and the right switch 150R are pressure sensitive type switches for detecting the load of a foot of the rider in this manner, they may be formed from a switch of any type such as the temperature sensitive type, infrared type, optical type or electrostatic capacity type only if it can detect that a rider's foot is placed thereon.

As shown in FIG. 10, the sub-control section 58 includes an input interface section 170, a driver section 172 and a first communication section 174 and principally acts as an interface between the electric mechanism of the simulated bicycle 12 and the main control section 18. The input interface section 170 is connected to the microphone 52 and the various sensors and performs an inputting of analog signals and digital signals. The driver section 172 controls the motor 96. The first communication section 174 transmits and receives various data to and from the main control section 18.

The main control section 18 includes a situation setting section 180 for setting a situation of a simulated ride, an arithmetic operation processing section 182 for performing an arithmetic operation process in response to a traveling situation, a display control section 184 for performing display control of the monitor 14, and a sound driver 186 for performing sound outputting of the speaker 15. The situation setting section 180 further includes a warning section 188 for issuing a predetermined warning to the rider, a speech recognition section 190 for recognizing speech of sound inputted from the microphone 52, and a second communication section 192 for performing communication control with the first communication section 174.

The main control section 18 includes a CPU (Central Processing Unit) for principally performing control, a ROM (Read Only Memory), a RAM (Random Access Memory) and a HD (Hard Disk) as storage sections, and so forth. The functioning sections of the main control section 18 shown in FIG. 10 are implemented by the CPU reading in a program recorded on the HD and executing the program in cooperation with the ROM, the RAM and predetermined hardware. Further, the main control section 18 is connected to a storage section 194 of a large capacity and can write and read various data into and from the storage section 194.

Figure 11:
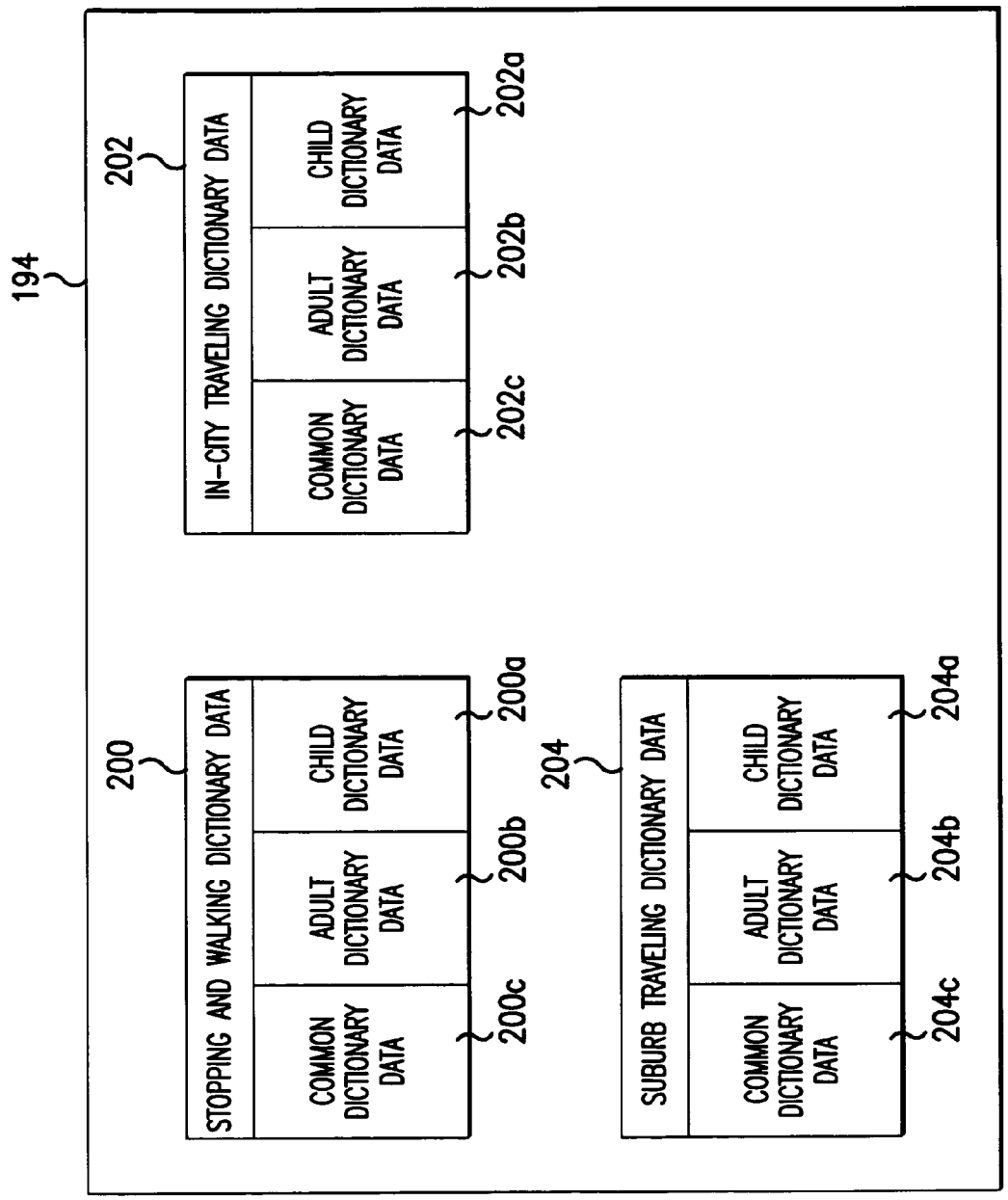
FIG. 11 is a diagrammatic view illustrating segmentation of dictionary data recorded in a storage section.

As shown in FIG. 11, three dictionary data for speech recognition corresponding to a walking mode, a retreating mode and a traveling mode, hereinafter described, are recorded in the storage section 194. In short, stopping and walking dictionary data 200 used in any mode other than the traveling mode, in-city traveling dictionary data 202 used when the rider travels in a city in the traveling mode and suburb traveling dictionary data 204 used when the rider travels in the suburbs in the traveling mode are provided in the storage section 194. The stopping and walking dictionary data 200 includes child dictionary data 200a used when the rider is a child, adult dictionary data 200b used when the rider is an adult and common dictionary data 200c used commonly for a child and an adult. Similarly, the in-city traveling dictionary data 202 includes child dictionary data 202a, adult dictionary data 202b and common dictionary data 202c, and the suburb traveling dictionary data 204 includes child dictionary data 204a, adult dictionary data 204b and common dictionary data 204c.

Each of the stopping and walking dictionary data 200, in-city traveling dictionary data 202 and suburb traveling dictionary data 204 (hereinafter referred to collectively as dictionary data) has a plurality of phrase data recorded therein and allows editing such as addition and deletion of phrase data in accordance with a predetermined procedure. Although each of the dictionary data is divided into a portion for a child and another portion for an adult, it may otherwise be divided for different languages (for example, Japanese and English).

As shown in FIG. 12, the in-city traveling dictionary data 202 includes a command column 206 and a process column 208, each of which is divided into and recorded as child dictionary data 202a, adult dictionary data 202b and common dictionary data 202c.

The command column 206a of the child dictionary data 202a has recorded therein phrase data such as "upper," "lower," "rear," "make heavier" and "make lighter" and in the process column 208 corresponding to the phrase data, and processes executed based on the phrase data are recorded. In particular, the process corresponding to "upper" is a "bird's eye view display" and indicates that a scene is displayed in a bird's eye view on the screen 14a. The process corresponding to "lower" is a "rider's eye view display" and indicates that a scene is displayed in a view of an eye of the rider on the screen 14a. The process corresponding to "make heavier" is an "increase of the load and an increase of the velocity coefficient" and indicates that the load to the flywheel 30 is increased and the velocity coefficient for calculating the simulation speed is increased. The process corresponding to "make lighter" is a "decrease of the load and a decrease of the velocity coefficient" and indicates that the load to the flywheel 30 is decreased and the velocity coefficient for calculating the simulation speed is decreased.

In the command column 206b of the adult dictionary data 202b, phrase data such as "bird's eye view," "rider's eye view," "shift-up" and "shift-down" are recorded, and processes are set and recorded so that the same processes as those of the "upper," "lower," "make heavier" and "make lighter" of the child dictionary data 202a are performed.

In the command column 206c of the common dictionary data 202c, phrase data such as "left" and "right" are recorded. The process corresponding to "left" is a "leftward screen display" and indicates that an image leftwardly of the rider at the point in time is displayed on the screen 14a. The process corresponding to "right" is a "rightward screen display" and indicates that an image rightwardly of the rider at the point in time is displayed on the screen 14a.

Also the stopping and walking dictionary data 200 and the suburb traveling dictionary data 204 have a format that is the same as that of the in-city traveling dictionary data 202 and have recorded therein processes necessary for stop and walking and for suburban traveling and phrase data for causing the processes to be executed. In the stopping and walking dictionary data 200 between them, phrase data same as "left" and "right" from among the phrase data mentioned are recorded, but such phrase data as "make heavier," "make lighter," "shift-up" and "shift-down" which are unnecessary upon stopping and upon walking are not recorded.

It is to be noted that, since each of the stopping and walking dictionary data 200, in-city traveling dictionary data 202 and suburb traveling dictionary data 204 acts such that the recognized speech of the rider is inputted and a predetermined speech command process (refer to FIG. 27) is outputted, it is also called a speech filter.

Now, a method of performing simulated riding of the bicycle using the simulation apparatus 10 having such a configuration as described above is described with reference to FIGS. 13 to 27. The following process relates to a process executed cooperatively by the main control section 18 and the sub-control section 58 after a predetermined power supply switch is turned on to start the main control section 18 and the sub-control section 58. In the following description, processing of the main control section 18 and processing of the sub-control section 58 are described without distinction therebetween, and unless otherwise specified, processing is performed in the order of the denoted step numbers.

Figure 13:
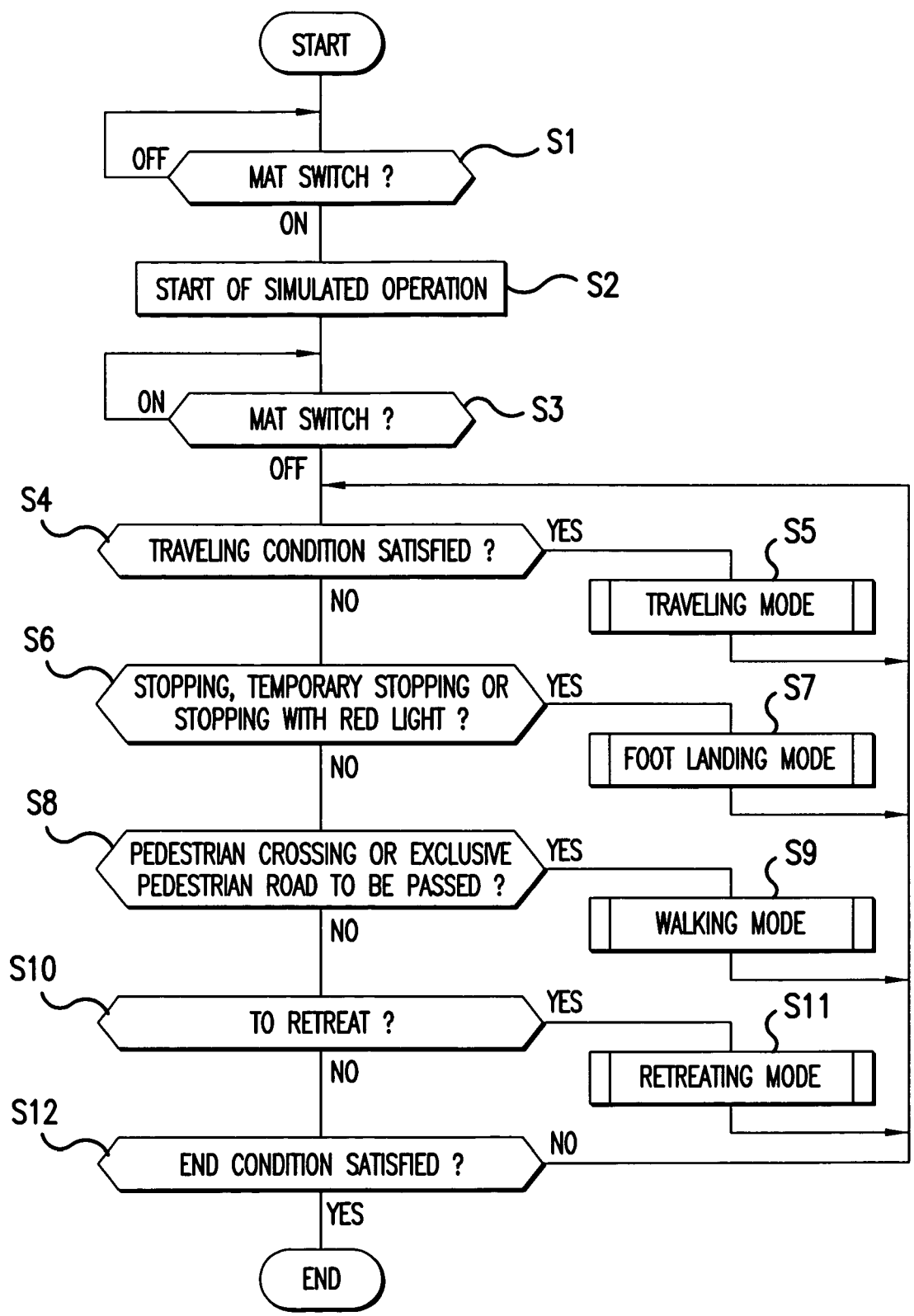
FIG. 13 is a flow chart of a main routine of a method of performing simulated operation of the bicycle using the simulation apparatus.
Figure 14:
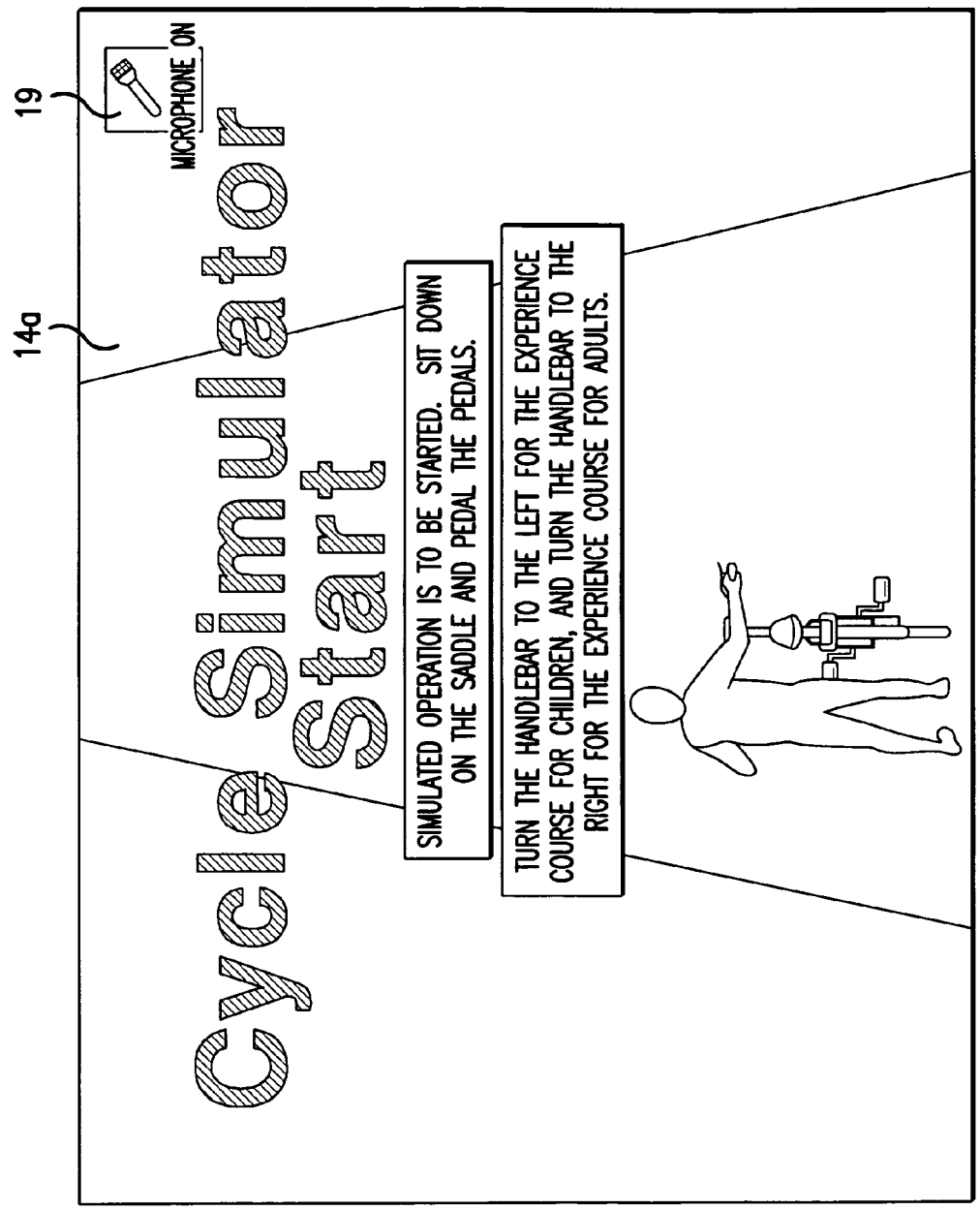
FIG. 14 is a view showing a start screen.

At step S1 of FIG. 13, it is confirmed whether or not the mat switch 16 is on. In particular, when at least one of the left switch 150L and the right switch 150R of the mat switch 16 is switched on, the processing advances to step S2, but when both of them are off, the processing stands by at step S1. In other words, if the rider stands on the mat switch 16, then the processing advances to step S2 automatically. Before then, the processing stands by at step S1 and the apparatus can be left in a predetermined power saving mode (for example, the monitor 14 is off).

At step S2, a simulated operation is started and a predetermined start screen (refer to FIG. 14) is displayed on the screen 14a. The start screen displays an image of a stopping bicycle and an image of a person who is the rider standing alongside the bicycle. Further, characters of "Simulated operation is to be started. Sit down on the saddle and pedal the pedals." are displayed on the screen 14a, or an audible statement is issued from the speaker 15 (hereinafter referred to collectively as "issue an instruction"). Further, an instruction of "Turn the handlebar to the left for the experience course for children, and turn the handlebar to the right for the experience course for adults." is issued.

In this manner, simulated operation can be started automatically by treading the mat switch 16, and a complicated operation is unnecessary and a simulated operation can be started without an unfamiliar feeling. Further, the rider may perform an operation in accordance with an instruction issued from the screen 14a or the speaker 15, and a manual or the like is unnecessary and an easy operation is possible. Thus, even a child can perform a simulated operation.

At step S3, it is confirmed whether or not the mat switch 16 is off. In particular, if both of the left switch 150L and the right switch 150R are off, then the processing advances to step S4, but if at least one of them is on, then the processing stands by at step S3.

In other words, if the rider is seated on the saddle 24 and removes his/her feet from the mat switch 16, then the processing advances automatically to step S4, at which time an actual traveling of the simulated operation can be started. At this time, the start screen described above is ended, and an image of the bicycle and an image of the person riding on the bicycle are displayed.

When it is recognized based on a signal of the steering angle sensor 50 that the handlebar 28 is operated to the left, it is decided that the experience course for a children is selected and the rider is a child. On the other hand, where it is recognized that the handlebar 28 is operated to the right, it is decided that the experience course for adults is selected and the rider is an adult. Then, a predetermined flag corresponding to the selected course is set.

At step S4, it is confirmed whether or not a predetermined traveling condition is satisfied. If the traveling condition is satisfied, then the processing advances to the traveling mode at step S5, but if the traveling condition is not satisfied, then the processing advances to step S6.

At step S6, it is confirmed whether or not the situation of the simulated operation is a stopping, temporary stopping or red light situation. If the situation of the simulated operation is a stopping, temporary stopping or red light situation, then the processing advances to a foot landing mode at step S7, but in any other case, the processing advances to step S8.

At step S8, it is confirmed whether or not the situation of the simulated operation is a situation where the bicycle is to pass a preferential pedestrian road such as a pedestrian crosswalk or an exclusive pedestrian road such as a sidewalk. When the bicycle is to pass a preferential pedestrian road or an exclusive pedestrian road, the processing advances to a walking mode at step S9, but in any other case, the processing advances to step S10.

At step S10, it is confirmed whether or not the situation of the simulated operation is a situation where the bicycle is to retreat. When the bicycle is to retreat, the processing advances to a retreating mode at step S11, but in any other case, the processing advances to step S12.

At step S12, it is confirmed whether or not a predetermined end condition is satisfied. If the end condition is satisfied, then the simulated operation is ended, but if the condition is not satisfied, then the processing returns to step S2 to continue the simulated operation. Also after the process at step S5, S7, S9 or S11 the processing returns to step S2.

When the simulated operation is to be ended, it is confirmed whether or not the mat switch 16 is on similarly as at step S1 described above. In this instance, since the mat switch 16 has been switched on, it can be detected that the rider gets off the simulated bicycle 12, and the simulated operation is ended based on the detection and the standby state such as the predetermined power saving mode is restored. It is to be noted that, if no operation of the simulated bicycle 12 is performed within a predetermined period after the mat switch 16 is turned off at step S2 described hereinabove, it is considered that the rider who treads the mat switch 16 has left the simulated bicycle 12 without getting on the simulated bicycle 12, also in this instance, the standby state may be restored.

Now, the traveling mode is described. The traveling mode is a mode wherein the rider seated on the saddle 24 pedals the pedals 38L and 38R and operates the handlebar 28 to perform simulated traveling.

Figure 15:
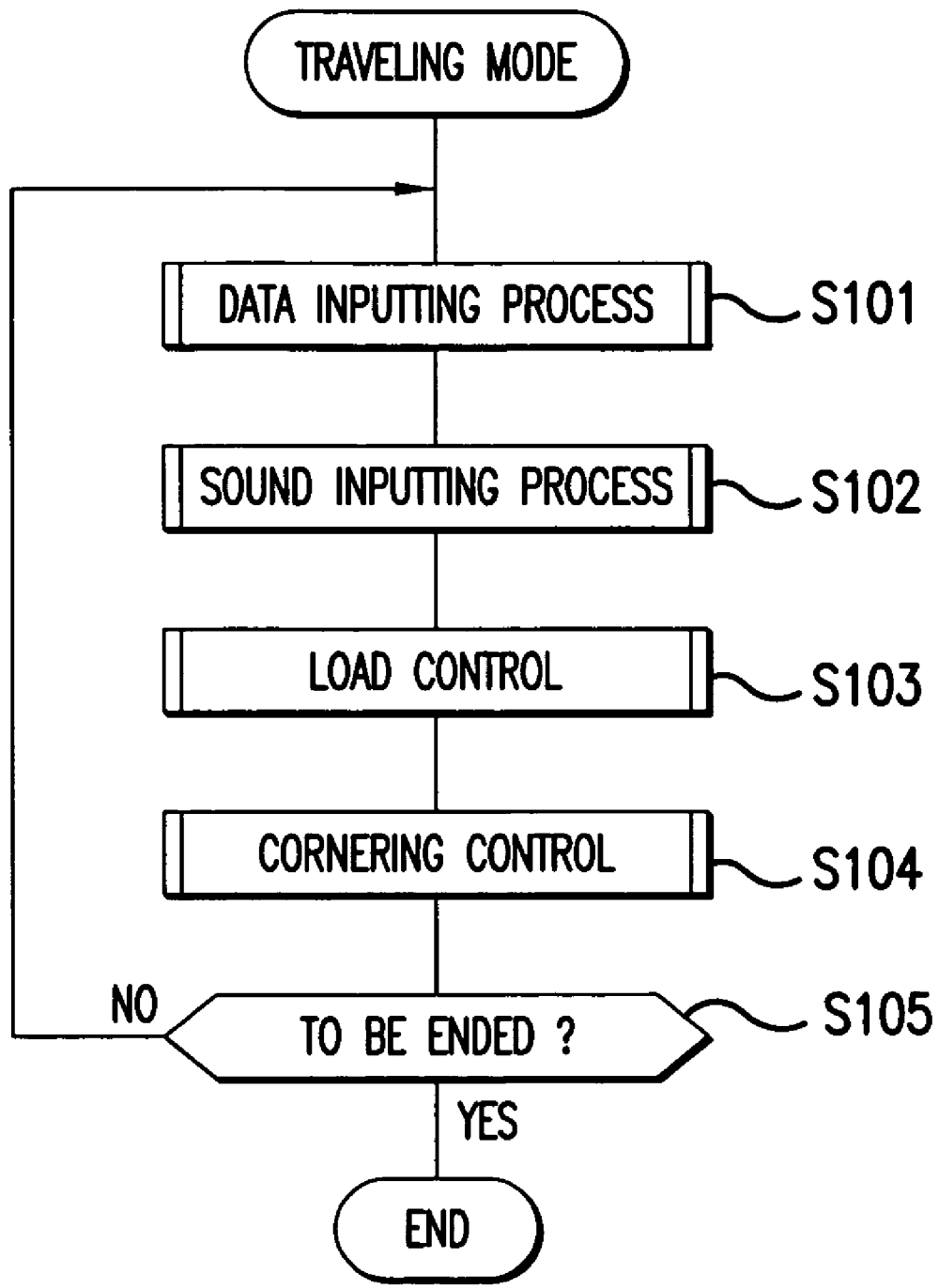
FIG. 15 is a flow chart of a traveling mode.

As seen in FIG. 15, in the traveling mode (at step S5 of FIG. 13), a data inputting process is performed first at step S101. In the inputting process, signals of the steering angle sensor 50, rotation sensors 106L and 106R, speed pickup 120, left proximity sensor 132L, right proximity sensor 132R and retreating switch 140 are read. For analog signals among the signals, predetermined AD conversion is performed, and the resulting digital signals are read.

Further, in the inputting process, data inputted from the speed pickup 120 is FV converted to determine a simulated traveling speed V. Thereupon, if the estimated gear ratio is high, then the speed of rotation of the flywheel 30 determined by the FV conversion is multiplied by a velocity coefficient higher than 1.0 corresponding to the gear ratio to determine the traveling speed V.

Figure 17:
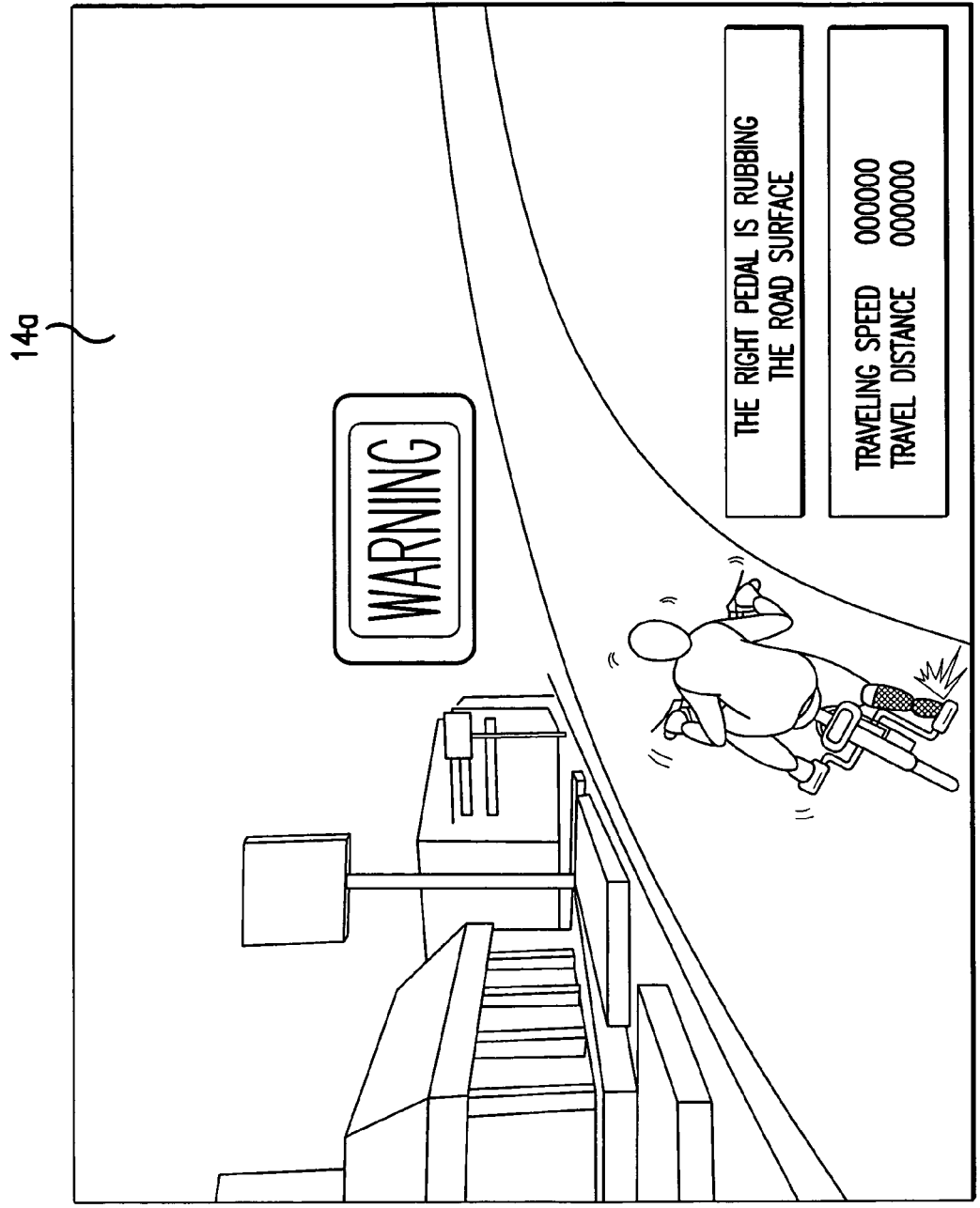
FIG. 17 shows a display on a screen illustrating a warning during cornering traveling.

Further, as occasion demands, a travel distance, maximum velocity, an average velocity, travel time and so forth should be determined and displayed on the screen 14a (refer to FIG. 17). Further, as occasion demands, the speed of rotation of the crankshaft 34 may be determined from the left proximity sensor 132L and the right proximity sensor 132R and displayed on the screen 14a. If the speed of rotation by the feet of the rider that is displayed on the screen 14a is changed in response to the speed of rotation of the crankshaft, then a more realistic image is obtained. To keep the speed of rotation of the crankshaft to be significant for the body upon the traveling of a bicycle over a long distance, and display of the speed of rotation of the crankshaft on the screen 14a is preferable to a training application.

The traveling speed V is not necessarily determined by the speed detection section 46 but may be based on a parameter generated by the rider pedaling the pedals 38L and 38R. For example, the traveling speed V may be estimated from the speed of rotation of the crankshaft described above and signals of the rotation sensors 106L and 106R are representative of an amount of brake operation.

At step S102, a sound inputting process is performed under the action of the speech recognition section 190 to recognize the speech of the rider inputted from the microphone 52. Detailed contents of the sound inputting process are hereinafter described.

At step S103, a load control for the flywheel 30 is performed. In the load control, when the situation of the simulated operation is acceleration or uphill traveling, the load is increased, but when the situation of the simulated operation is flat road traveling or downhill traveling, the load is decreased. Further, the load is increased substantially in proportion to a sum value of a signal of the rotation sensor 106L and a signal of the rotation sensor 106R. Since the signals of the rotation sensors 106L and 106R are interlocked with a braking operation, the load is increased to provide a braking action by such braking operation.

The load to the flywheel 30 is adjusted by adjusting the tilting angle of the load plate 90 under the action of the motor 96 to change the distance between the ferrite magnets 98 and the rim 30a as described hereinabove.

At step S104, cornering control is considered when the traveling situation is cornering (including traveling at a corner of a street, U-turn and so forth). Detailed contents of the cornering control are hereinafter described.

At step S105, a predetermined condition is checked to determine whether or not the traveling mode should be ended. When the traveling mode should be continued, the processing returns to step S101 described hereinabove.

It is to be noted that, while the traveling mode is being executed, the signal of the mat switch 16 is checked, and if the mat switch 16 is turned on during traveling during which the traveling speed V is not 0, then an instruction of "Don't land your foot during traveling." should be issued. In order to end the simulated operation of the simulation apparatus 10, it is only necessary for the rider to tread the mat switch 16 and there is no necessity to perform a special operation.

On the other hand, separately from the process of the traveling mode illustrated in FIG. 15, a process of the display control section 184 is executed simultaneously and parallel by a multi-task processing. The display control section 184 executes control for changing the scene to be displayed on the screen 14a while performing a transmission and reception of data to and from an execution section of the traveling mode. In the display control, the scene to be displayed on the screen 14a is changed on the real time basis based on the traveling speed V determined at step S101 described hereinabove and the steering angle $\theta_H$ of the handlebar 28 detected by the steering angle sensor 50.

Further, the eye point of the scene displayed on the screen 14a is changed based on the speech obtained at step S102 described hereinabove, and if the speech is "left," then a scene estimated to be a scene on the left of the rider is displayed. However, if the speech is "right," then a scene estimated to be a scene on the right of the rider is displayed. If the speech is "front," then the display of a scene on the front of the rider is restored.

Further, if the speech is "upper," then a scene when the front is viewed from a bird's eye view point at an oblique rear position is displayed together with an image of the bicycle and an image of the person riding on the bicycle. If the speech is "lower," then a scene when the front is viewed from the view point of the rider is displayed. If the speech is "rear" (back), then a scene when the front is viewed from a virtual vehicle traveling rearwardly.

The display control section 184 executes also the foot landing mode, walking mode and retreating mode simultaneously and parallel as multi-tasks and performs a display of the screen 14a on the real time basis.

Figure 16:
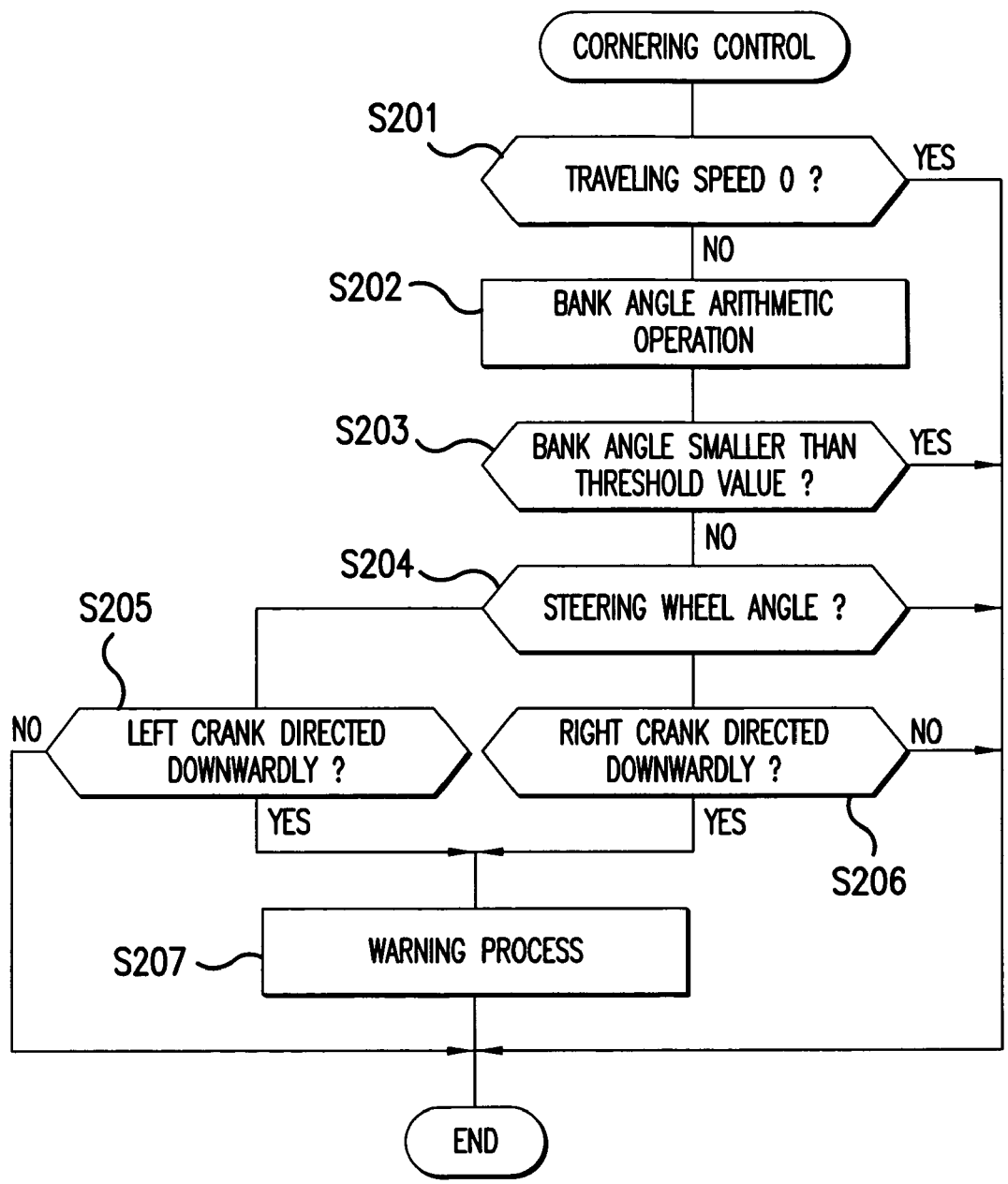
FIG. 16 is a flow chart of cornering control.

As shown in FIG. 16, in the cornering control (at step S104 of FIG. 15) in the traveling mode, it is confirmed first at step S201 whether or not the traveling speed V is 0. If the traveling speed V is 0, since the bicycle is in a stopping state, the cornering control process is ended. However, if V>0, then it is determined that the bicycle is traveling and the processing advances to step S202.

At step S202, a simulated bank angle $\theta_B$ is determined from the traveling speed V and the steering angle $\theta_H$ of the handlebar 28. By determining the bank angle $\theta_B$ and creating various traveling situations, a simulated operation which provides a feeling of presence can be anticipated.

At step S203, it is confirmed whether or not the bank angle $\theta_B$ is equal to or higher than a predetermined threshold value. If the bank angle $\theta_B$ is equal to or higher than the threshold value, then the cornering control is ended, but if the bank angle $\theta_B$ is lower than the threshold value, then the processing advances to step S204.

At step S204, the steering angle $\theta_H$ of the handlebar 28 is confirmed. If the steering angle $\theta_H$ is 0, then since the bicycle is traveling in a straightforward direction, the cornering control process is ended. If the steering angle $\theta_H$ has a positive value and the bicycle is being steered to in the leftward direction, then the processing advances to step S205. However, if the steering angle $\theta_H$ has a negative value and the bicycle is being steered to in the rightward direction, then the processing advances to step S206.

At step S205, it is confirmed whether or not the left crank 36L is directed downwardly. More particularly, when the left proximity sensor 132L is on, since the crank 36L is directed downwardly, the signal of the left proximity sensor 132L is checked. If the signal is on, then the processing advances to step S207. However, if the signal is off, then the cornering control process is ended.

At step S206, it is confirmed whether or not the right crank 36R is directed downwardly. More particularly, when the right proximity sensor 132R is on, since the crank 36R is directed downwardly, the signal of the right proximity sensor 132R is checked. If the signal is on, then the processing advances to step S207. However, if the signal is off, then the cornering control process is ended.

At step S207, a warning process is performed. In particular, the step S207 corresponds to a case wherein the bicycle is cornering and the bank angle $\theta_B$ is equal to or greater than the predetermined angle and, in addition, the crank 36L or 36R which is on the inner side of the corner is directed downwardly. Therefore, the situation of the simulated operation is such that the pedal 38L provided at the end of the crank 36L or the pedal 38R provided at the end of the crank 36R rubs the road surface. By issuing such a situation as just described as a warning, the simulation apparatus can cause the rider to learn a basic operation method of a bicycle so that improper operation may not be performed.

This warning is performed by the warning section 188 (refer to FIG. 10) cooperating with the display control section 184 and the sound driver 186 such that simulated sound generated when the pedals 38L and 38R rub the road surface is generated by the speaker 15 and the display control section 184 causes an image of the bicycle and a person riding on the bicycle and being rocked to be displayed on the screen 14a (refer to FIG. 17). Further, on the image, particularly the pedal 38L or 38R which is rubbing the road surface may be emphasized by a flickering display, changed color display or the like. Further, the characters of "warning" or the like may be displayed in an emphasized fashion on the screen 14a.

By issuing a warning to the rider through the visual and acoustic senses in this manner, the rider can feel as if the pedal 38L or 38R actually rubbed the road surface, and this is very effective in learning the operation of a bicycle.

Further, the method of warning may be selectively determined in accordance with the liking of the rider, and, for example, an electronic sound may be generated, or a message "a pedal is rubbing the road surface" may be audibly issued. Further, where the simulation apparatus 10 is used for a game, a demerit mark process of a score should be performed at step S207. This demerit mark process may be performed in various warning processes hereinafter described.

After this step S207, the cornering control process is ended. It is to be noted that, although, in the cornering control, only the state of the crank on the inner side of the corner is determined as an object of the detection. However, the state of the crank on the outer side of the corner which is the opposite side may be detected. In particular, since it is considered better to keep, during high speed cornering of a bicycle, the pedal on the outer side of the corner treaded down in a pressing fashion, a merit mark process or the like may be performed confirming that the crank on the outer side of the corner is lowered correctly.

At S207 which is a warning section at which a warning is issued in the cornering process, a warning may be issued when the handlebar 28 is operated by more than a predetermined amount in a direction that is the same as the direction in which the crank is lowered irrespective of the steering angle $\theta_B$. Or, a warning may be issued by searching a predetermined map based on the traveling speed V and the steering angle $\theta_H$.

Now, the foot landing mode is described. The foot landing mode is a mode for allowing the rider to stop the bicycle at a temporary stopping place or the like and touch the road surface with a foot thereof to perform a confirmation of a safety operation or the like.

Figure 18:
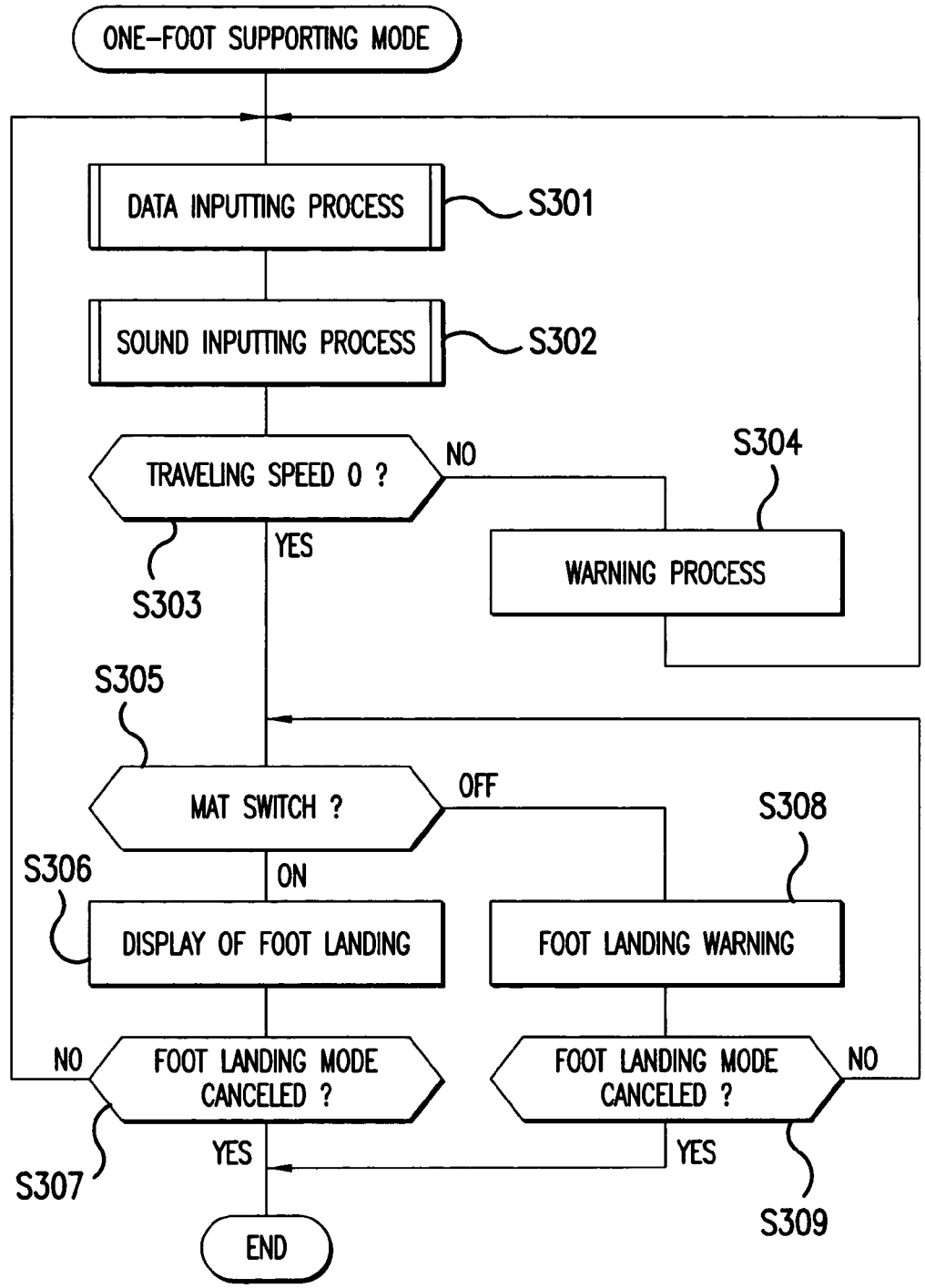
FIG. 18 is a flow chart of a foot landing mode.
Figure 19:
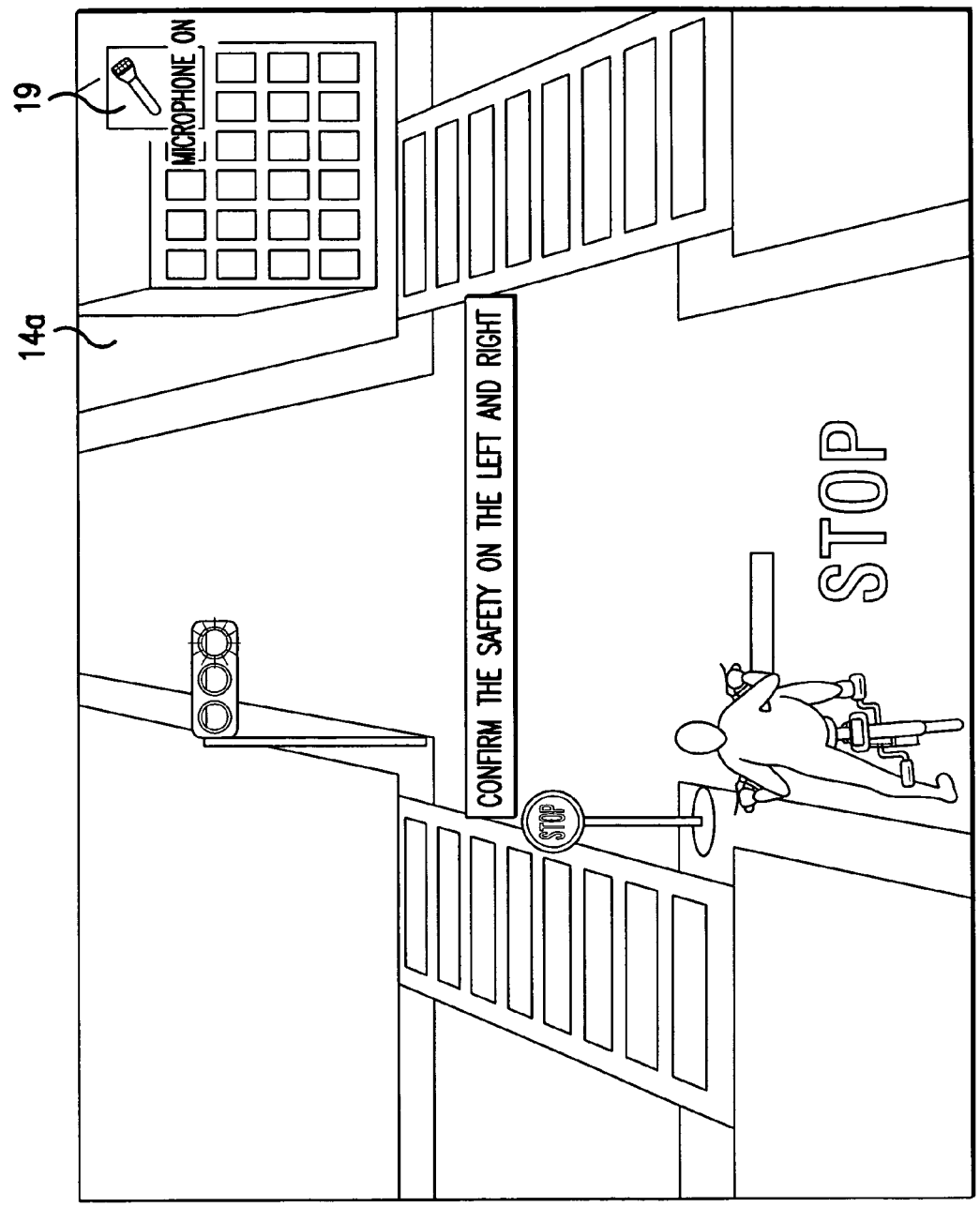
FIG. 19 shows a display on the screen illustrating a state wherein the bicycle temporarily stops in the foot landing mode.

As shown in FIG. 18, in the foot landing mode (at step S7 of FIG. 13), a data inputting process and a sound inputting process similar to those at steps S101 and S102 (refer to FIG. 15) described hereinabove are executed at steps S301 and S302, respectively.

At step S303, it is confirmed whether or not the traveling speed V is 0. If the traveling speed V is not 0, then a warning process is performed at step S304, whereafter the processing returns to step S301. In other words, the processing stands by while the processes at steps S301 to S304 are successively performed until after the traveling speed V becomes equal to 0. When the traveling speed V is 0, the processing advances to next step S305.

The warning process at step S304 is, for example, issuance of an instruction such as "brake the bicycle to stop" or the like. Further, if it is decided that the situation of the simulated operation is that the bicycle passes over the stop line at a crossing or the like, then a warning of a greater sound volume or a warning of a more emphasized display may be issued as a warning of a higher level or the simulated operation may be interrupted.

At step S305, it is confirmed whether or not the mat switch 16 is on (that is, whether or not at least one of the left switch 150L and the right switch 150R is on) a similar step as set forth in step S1 described hereinabove. If the mat switch 16 is on, then the processing advances to step S307. However, if the mat switch 16 is off, then the processing advances to step S308.

At step S306, an image of the bicycle and an image of a person who remains seated on the seat of the bicycle and places a foot thereof on the ground (refer to FIG. 19) are displayed on the screen 14a under the control of the display control section 184. Further, an instruction of "Confirm the safety on the left and right" is displayed on the screen 14a.

At step S306, for example, in order for the rider to confirm the safety on the left and right with certainty, the rider may be urged to utter "left" and "right." In this instance, the utterance is recognized by the speech recognition section 190, and left and right images at the temporarily stopping place are displayed on the screen 14a. If an approaching vehicle is displayed on any of the images, re-starting should be inhibited.

At step S307, it is confirmed whether or not the foot landing mode is canceled. If the one-foot standing mode is not canceled, then the processing returns to step S301 to continue the processing of the foot landing mode. However, if the foot landing mode is canceled, then the processing of the foot landing mode is ended. The foot landing mode is canceled, for example, when the traffic signal changes from red to green in the situation of the simulated operation or when the safety confirmation on the left and right is performed with certainty.

On the other hand, at step S308, although the traveling speed is 0, the rider is in a state wherein the rider does not land a foot thereof, and a foot-landing warning is issued. In particular, when the rider rides a two-wheeled vehicle including not only a bicycle but also a motorcycle or the like, it is significant for the safety education to stop with certainty with a foot landed at a location at which a traffic control signal for temporary stopping is present. In other words, such a situation as to only slow down or to temporarily stop without landing a foot and re-start the vehicle must be avoided. Accordingly, when it is confirmed based on the signal of the mat switch 16 that no foot is landed, a foot landing warning is issued.

Figure 20:
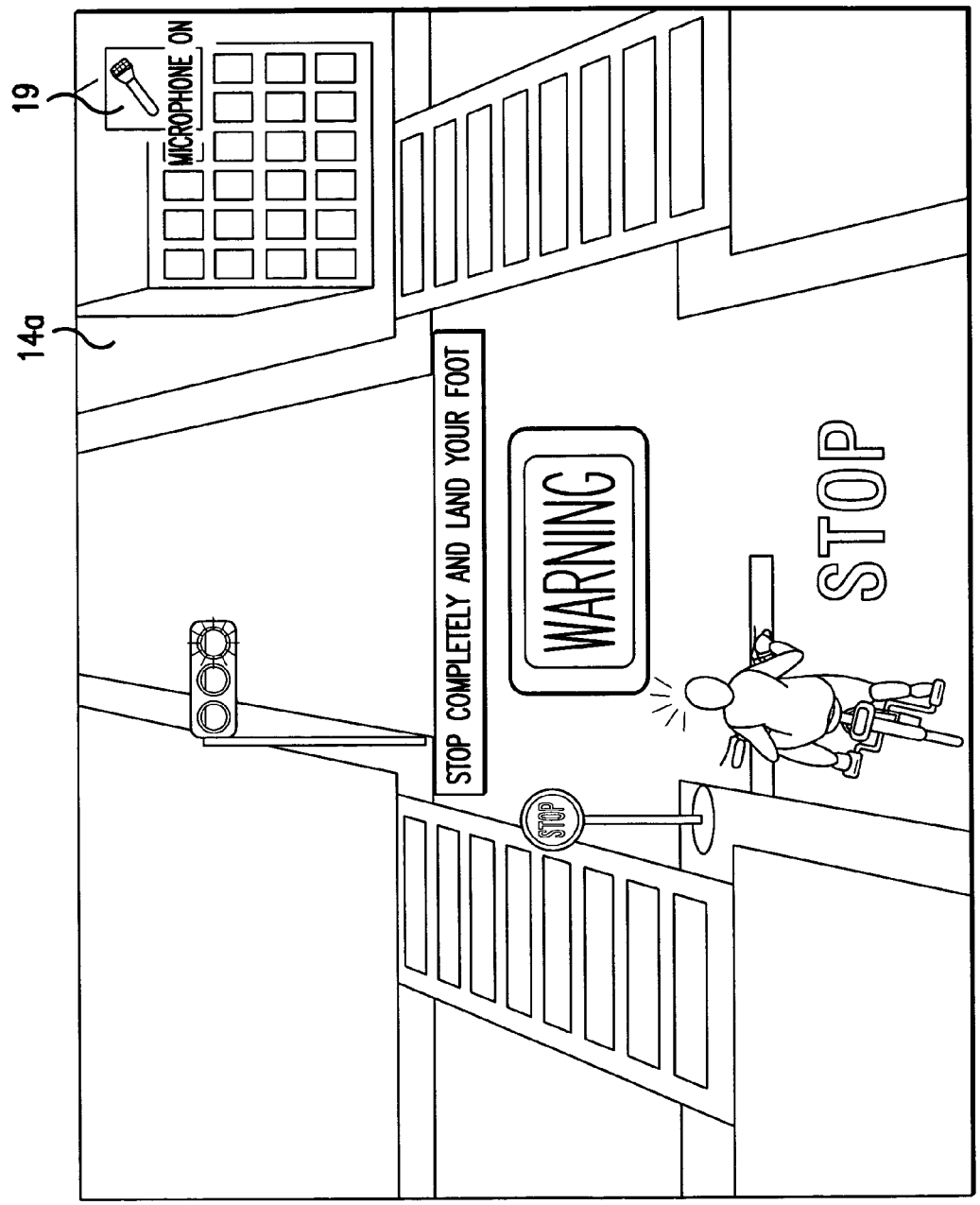
FIG. 20 shows a display on the screen which indicates a warning in the foot landing mode.

As the foot landing warning, an image that a bicycle and a person who rides on the bicycle have fallen down (or are rocked) should be displayed on the screen 14*a* under the control of the display control section 184 as seen in FIG. 20. Such an instruction as "Warning," "Stop fully and land your foot" or the like may be issued.

Further, the number of times by which the process at step S308 is executed may be counted such that, when the number of times exceeds a predetermined value, an image of a bicycle which falls down fully is displayed on the screen 14*a* and a warning of the high level described above is issued.

At step S309, it is confirmed whether or not the foot landing mode is canceled similarly as at step S307 described hereinabove. If the foot landing mode is canceled, then the processing of the foot landing mode is ended. However, if the foot landing mode is not canceled, then the processing returns to step S305.

Now, the walking mode is described. The walking mode is a mode for a situation wherein a rider walks pushing the bicycle on an exclusive pedestrian road or the like and is a mode for a situation wherein the rider learns, for example, such a manner of walking and pushing the bicycle wherein the rider does not provide an obstacle to the other pedestrians and so forth.

Figure 21:
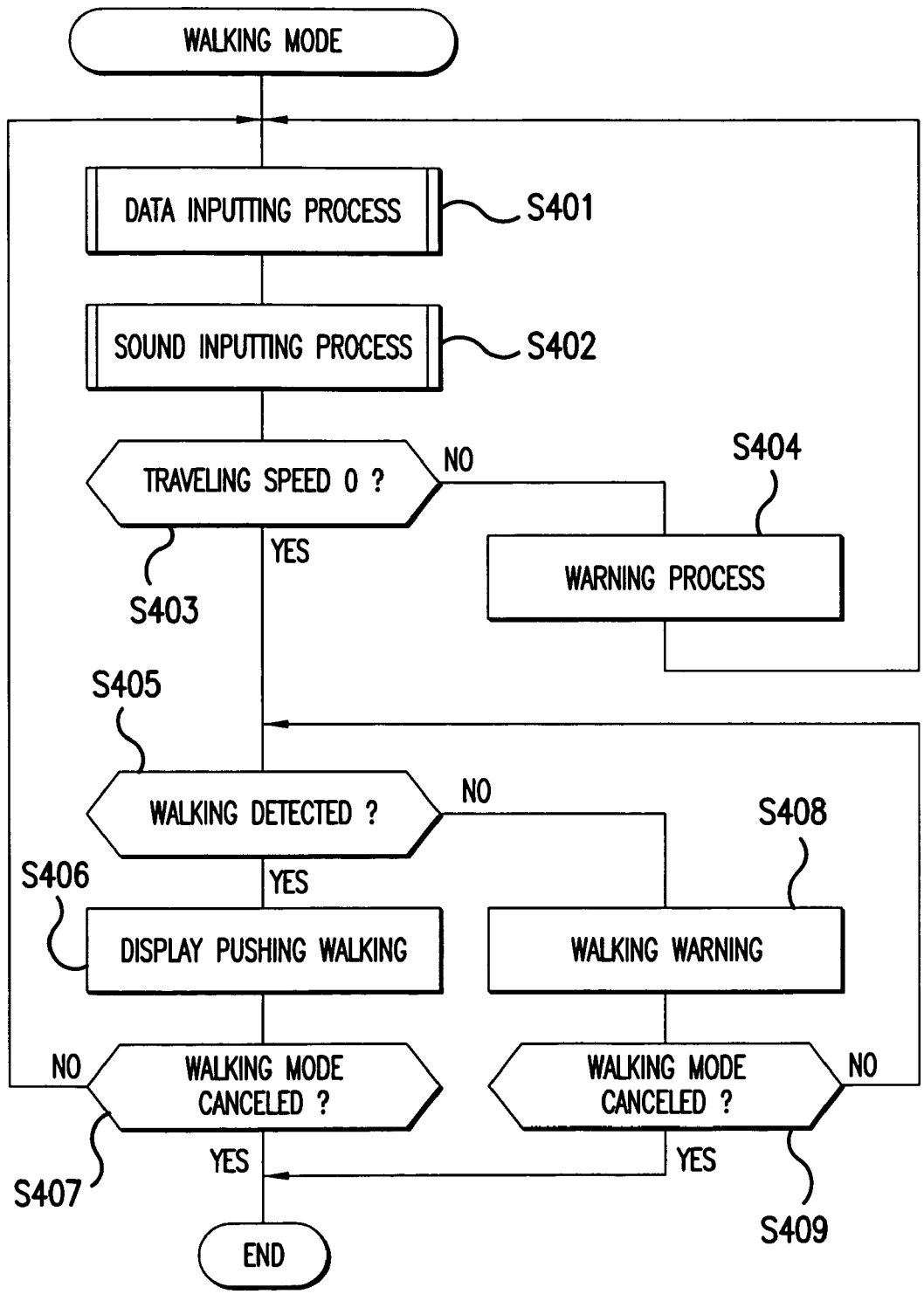
FIG. 21 is a flow chart of a walking mode.

As seen in FIG. 21, in the walking mode (at step S9 of FIG. 13), processes similar to those at steps S301 to S304 described hereinabove, that is, a data inputting process, a sound inputting process, a traveling speed confirmation process and a warning process, are executed at steps S401 to S404, respectively.

If the traveling speed V is 0 at step S403, then it is confirmed at step S405 whether or not the rider is walking. If such walking is detected, then the processing advances to step S406, but in any other case, the processing advances to step S408.

Figure 22:
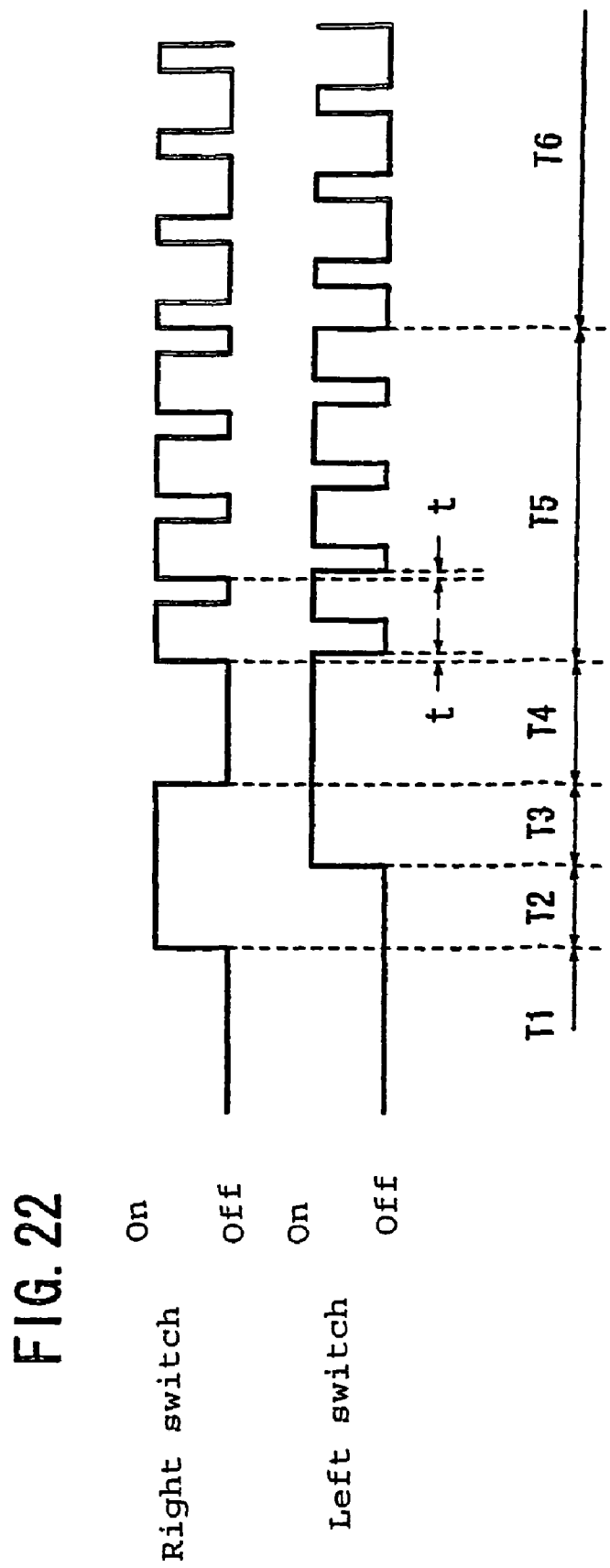
FIG. 22 is an input signal time chart of a right switch and a left switch of a mat switch.

The detection of walking in this instance is performed based on the signals of the left switch 150L and the right switch 150R as seen from FIG. 22, and within a period T1 within which both the left switch 150L and the right switch 150R continuously remain in an off state for more than a predetermined period of time, it is decided that the rider is riding on the bicycle. Within a period T2 and another period T4 within which only one of the left switch 150L and the right switch 150R continues to be on for more than the predetermined period of time, it is decided that one foot is landed. Within a period T3 within which both of the left switch 150L and the right switch 150R continue to be on for more than the predetermined period of time, it is decided that both feet are landed. Within a period T5 within which the left switch 150L and the right switch 150R alternately repeat on and off and a period t within which both of the left switch 150L and the right switch 150R exhibit an on state is involved, it is decided that the rider is walking and pushing the bicycle. Further, within a period T6 within which the left switch 150L and the right switch 150R alternately repeat on and off and a period within which both of the left switch 150L and the right switch 150R exhibit an on state is not involved, it is decided that the rider is running and pushing the bicycle.

If the period at step S405 is the period T5, then the processing advances to step S406, but if the period at step S405 is the period T1, T2, T3, T4 or T6, then the processing advances to step S408.

Figure 23:
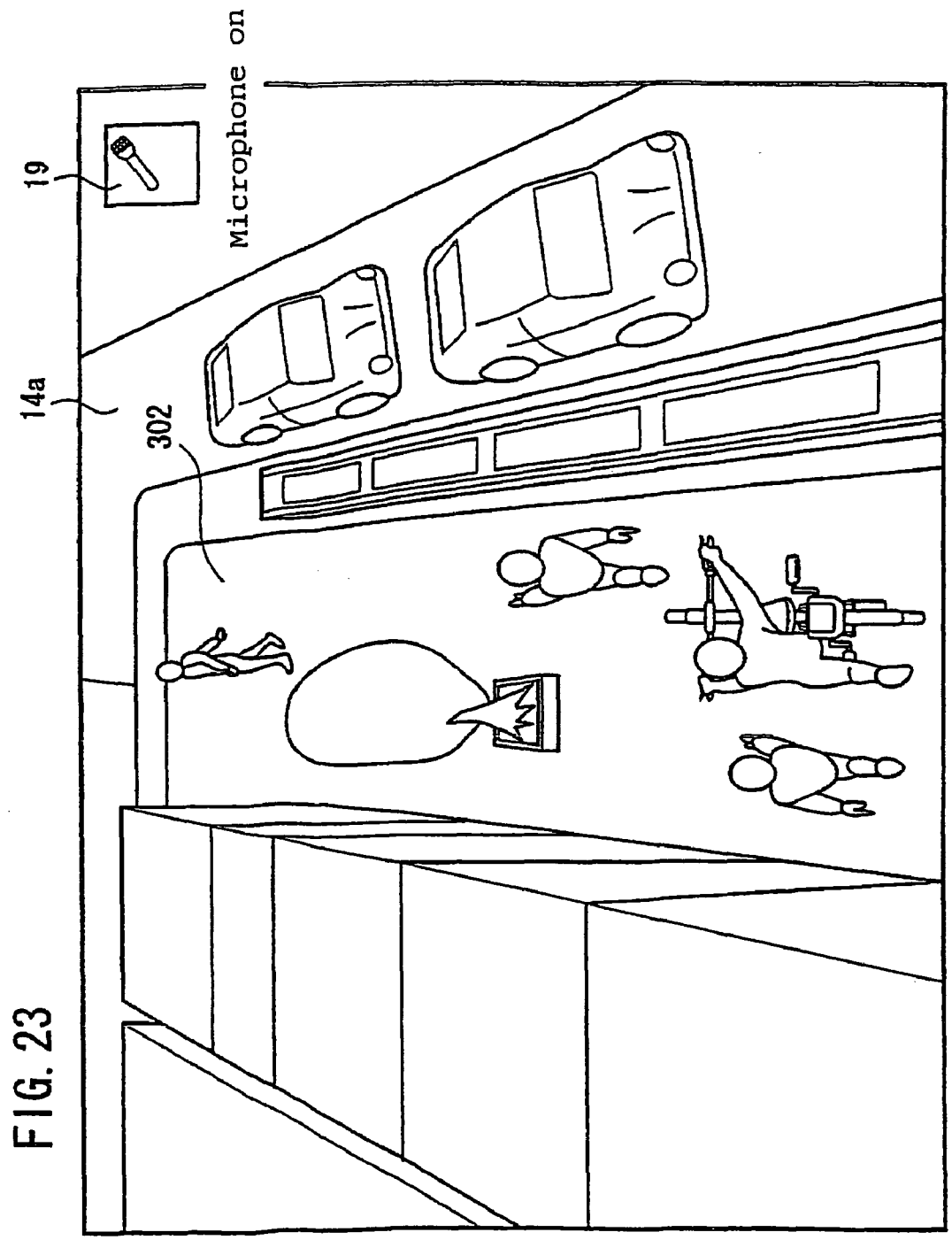
FIG. 23 shows a display on the screen in the walking mode.

At step 406, an image that the rider is getting off the bicycle is walking and pushing the bicycle is displayed on the screen 14*a* under the control of the display control section 184 (refer to FIG. 23). At this time, the advancing direction of the bicycle on the screen 14*a* may be changed based on the steering angle $\theta_H$ detected by the steering angle sensor 50. Further, the pushing walking and the pushing running may be determined distinctly to change the advancing speed.

At step S407, it is confirmed whether or not the walking mode is canceled. If the walking mode is not canceled, then the processing returns to step S401 to continue the processing of the walking mode. However, if the walking mode is canceled, then the walking mode process is ended. The walking mode is canceled, for example, when an end portion of the sidewalk or the pedestrian crossing along which the rider walks and pushes the bicycle is reached.

On the other hand, at step S408, the rider is not walking and pushing the bicycle, and a walking warning is issued. In particular, it is prescribed that, on the pedestrian road, a rider should walk and push a two-wheeled vehicle such as bicycle, and when the rider is not walking and pushing the bicycle, a predetermined warning is issued based on the signal of the mat switch 16.

The walking warning may be an issuance of an instruction such as "Warning," "Stop and walk pushing it," "Walk" or "Don't run." Further, the number of times by which the process at step S408 is executed may be counted such that, when the number of times exceeds a predetermined value, a warning of the high level described hereinabove is issued.

At step S409, it is confirmed whether or not the walking mode is canceled similarly as at step S407 described hereinabove. If the walking mode is canceled, then the walking mode process is ended, but if the walking mode is not canceled, then the processing advances to step S405.

Figure 24:
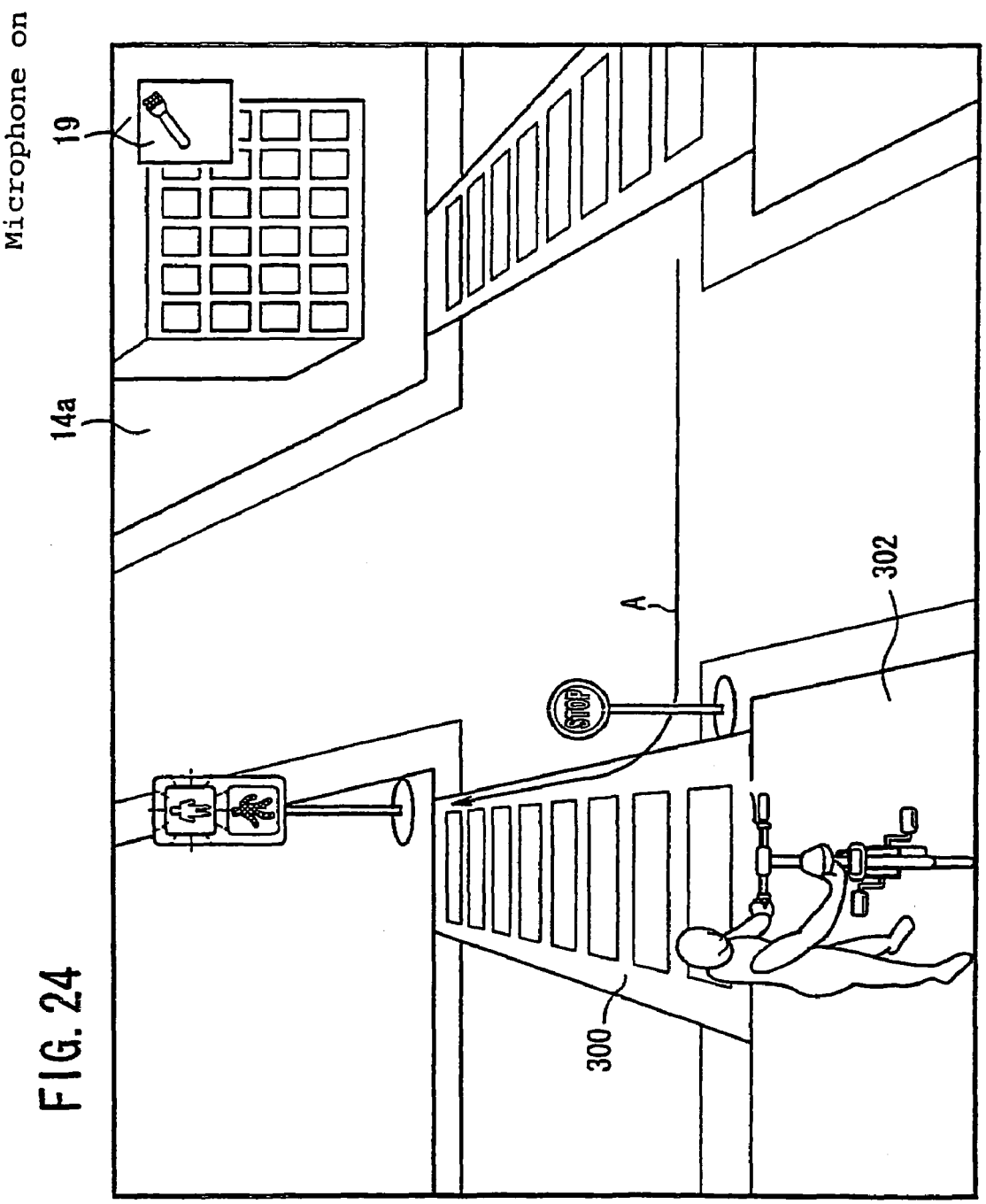
FIG. 24 shows a display on the screen illustrating a state wherein the bicycle retreats from a pedestrian crossing in a retreating mode.

Now, the retreating mode is described. The retreating mode is a mode in which the rider getting off the bicycle retreats from the pushing of the bicycle. For example, when the rider tries to turn to the right at a crossing while the bicycle is traveling on the left side of a roadway as seen in FIG. 24, the rider advances in a straightforward direction once and then changes the direction and walks and pushes the bicycle on a pedestrian crossing 300 as seen from a route indicated by an arrow mark A. However, if the traffic signal is red, then the rider must retreat in order to provide a refuge on a sidewalk 302.

Figure 25:
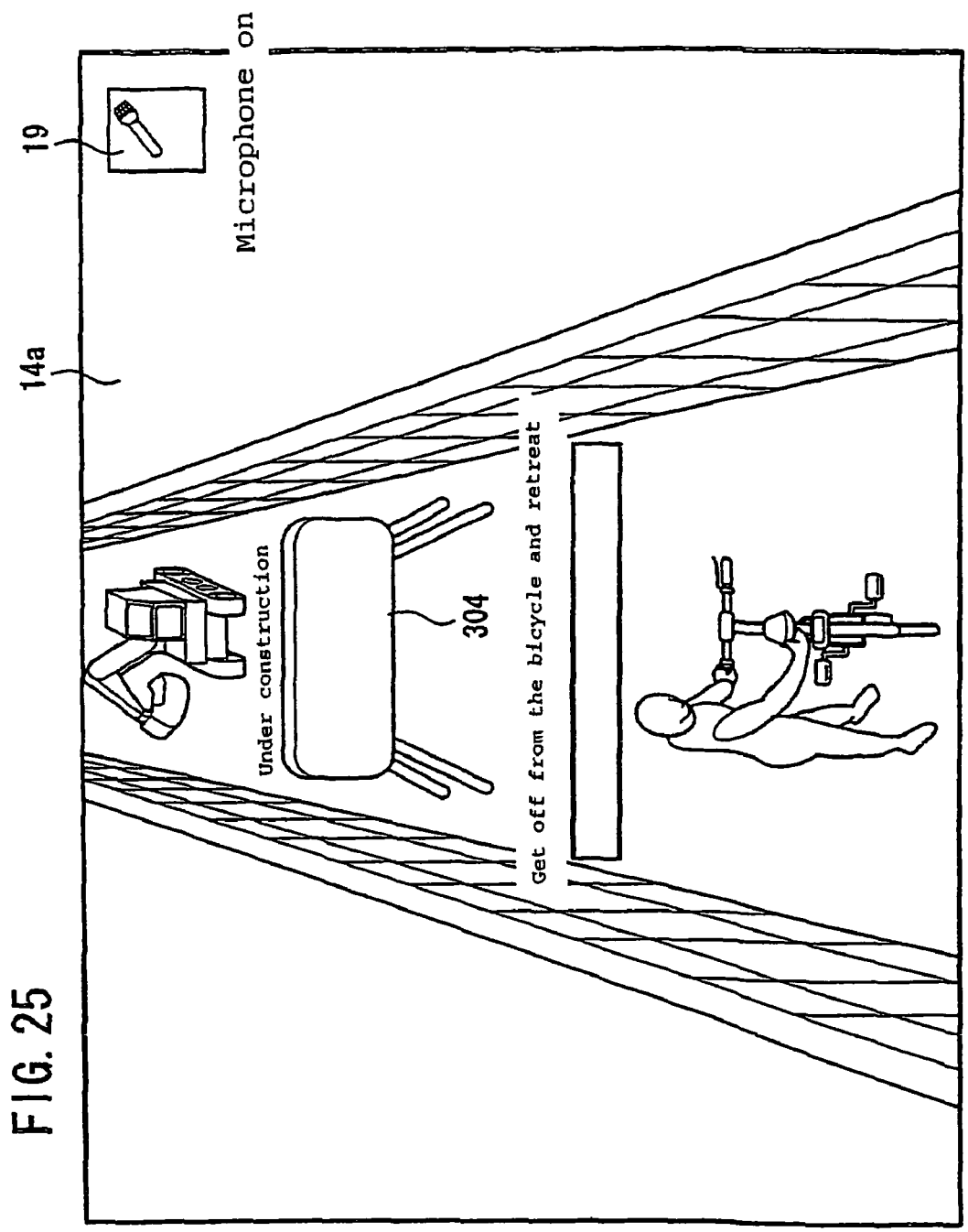
FIG. 25 shows a display on the screen illustrating a state wherein the bicycle retreats from the proximity of an obstacle in the retreating mode.

Further, if the bicycle comes excessively close to a simulated obstacle 304 positioned forwardly thereof as seen in FIG. 25, then since the bicycle cannot advance forwardly any more and must retreat, the retreating mode is entered. Also in a case other than the cases described, the retreating mode may be set to simulate a retreating movement such as a placement of a bicycle into or from a bicycle parking place.

Figure 26:
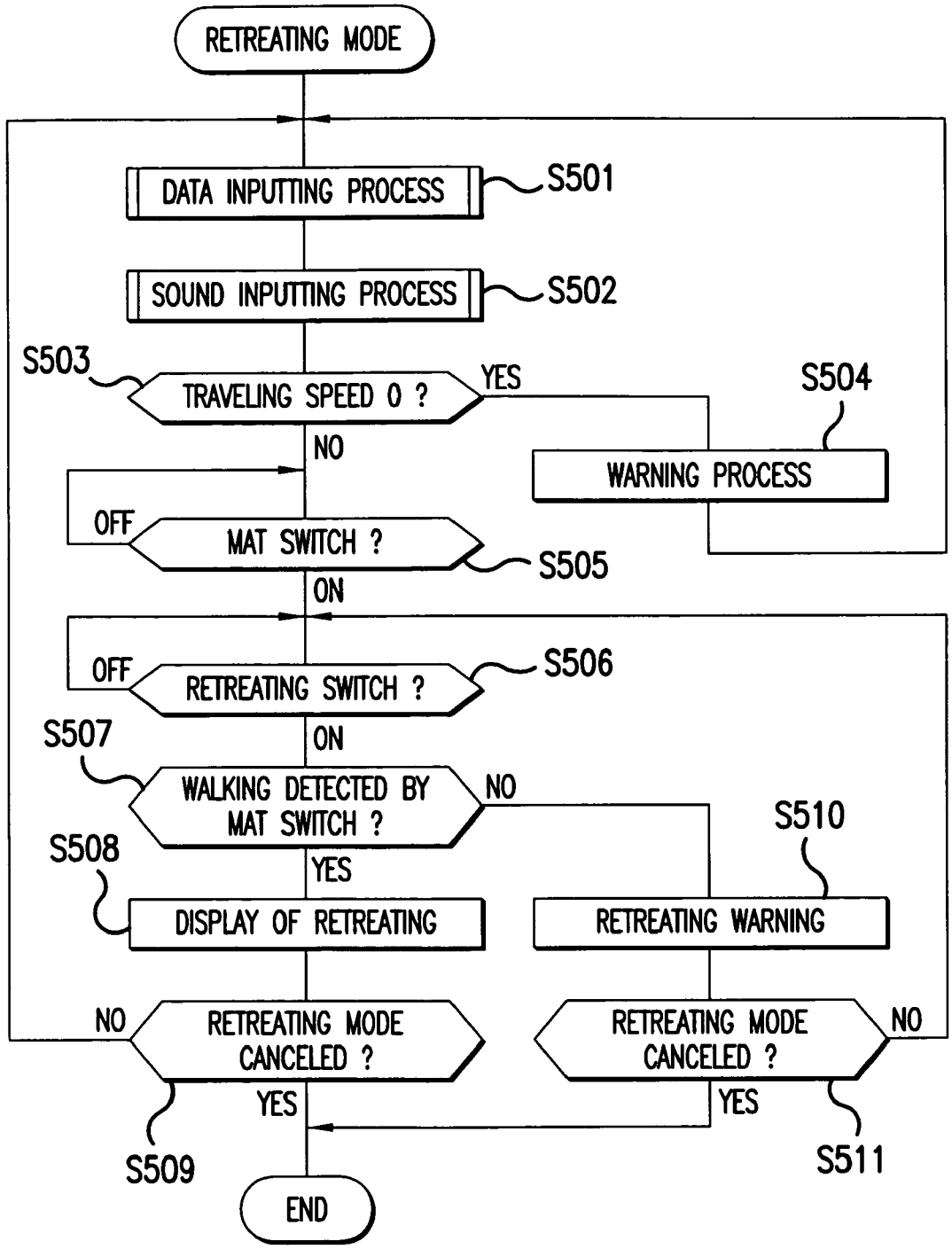
FIG. 26 is a flow chart of the retreating mode.

As seen in FIG. 26, in the retreating mode (at step S11 of FIG. 13), processes similar to those at steps S301 to S304 described hereinabove, that is, a data inputting process, a sound inputting process, a traveling speed confirmation process and a warning process, are executed at steps S501 to S504, respectively.

When the traveling speed V is 0 at step S503, it is confirmed at step S505 whether or not the mat switch 16 is on similar to the arrangement as set forth at step S1 described hereinabove.

If the mat switch 16 is on, then the processing advances to step S506, but if the mat switch 16 is off, then the processing stands by at step S503.

At step S506, it is confirmed whether or not the retreating switch 140 is on. If the retreating switch 140 is on, then the processing advances to step S507, but if the retreating switch 140 is off, then the processing stands by at step S506. In particular, when the rider gets off the bicycle and pushes the bicycle rearwardly, it is common for the rider to retreat grasping a left portion of the handlebar 28 with the left hand and grasping the saddle 24 with the right hand (refer to the images of a person in FIGS. 24 and 25). This is because, if the rider tries to retreat while the rider grasps the handlebar 28 without grasping the saddle 24, then the handlebar 28 is pivoted at the portion of the head tube 26 and the retreating direction is not settled. Accordingly, a correct posture in which the rider grasps the saddle 24 together with the lever 142 to push the bicycle rearwardly is obtained. Since the retreating switch 140 is turned on at this time, if the signal of the retreating switch 140 is detected, then it can be recognized that the bicycle is prepared for a retreating movement.

Further, since the retreating switch 140 is provided at a rear lower portion of the saddle 24, when the rider is seated on the saddle 24 and performs an ordinary simulated traveling in the operating mode and so forth described hereinabove, the rider is not likely to touch the retreating switch 140. Thus, there is no possibility that the retreating switch may be operated in error. In other words, the retreating switch 140 is disposed at a position at which it can be operated readily only when the rider gets off the bicycle, and a retreating movement, which is performed by the rider getting off the bicycle, becomes more realistic.

At step S507, the detection of walking is performed substantially similarly as at step S405 described hereinabove, and when walking is detected, the processing advances to step S508. However, in any other case, the processing advances to step S510. At this time, since the rider gets off the simulated bicycle 12 and stands alongside the simulated bicycle 12, one of the left switch 150L and the right switch 150R of the mat switch 16 is treaded at predetermined time intervals. Accordingly, if it is imagined that the rider gets off the simulated bicycle 12, for example, to the left side of the simulated bicycle 12, then the walking state may be detected based only on the left switch 150L of the time chart of FIG. 22, and it may be decided that the rider is in the walking state within the periods T5 and T6.

At step S508; an image that a rider having got off the bicycle retreats by pushing the bicycle is displayed on the screen 14a under the control of the display control section 184 as seen in FIGS. 24 and 25. At this time, the retreating direction of the bicycle on the screen 14a may be changed based on the steering angle $\theta_H$ detected by the steering angle sensor 50.

At step S509, it is confirmed whether or not the retreating mode is canceled. If the retreating mode is not canceled, then the processing returns to step S501 to continue the process of the retreating mode, but if the retreating mode is canceled, then the processing of the retreating mode is ended. In the case of the example shown in FIG. 24, the retreating mode is canceled when the bicycle retreats fully from the pedestrian crossing 300 to the sidewalk 302.

In this manner, in the retreating mode, since the screen 14a displays a corresponding image based on the operation of the rider in operating the grip detection section 56 of the simulated bicycle 12 and treading the mat switch 16 at predetermined time intervals, the rider can feel as if the rider actually moved the bicycle rearwardly. Further, after the bicycle retreats fully, the retreating mode is canceled and the rider is permitted to advance in any direction. Accordingly, even if the bicycle during the simulated operation excessively approaches an obstacle, such an unnatural process so as to end the simulated operation or to erase the simulated obstacle need not be performed, which is realistic.

Figure 27:
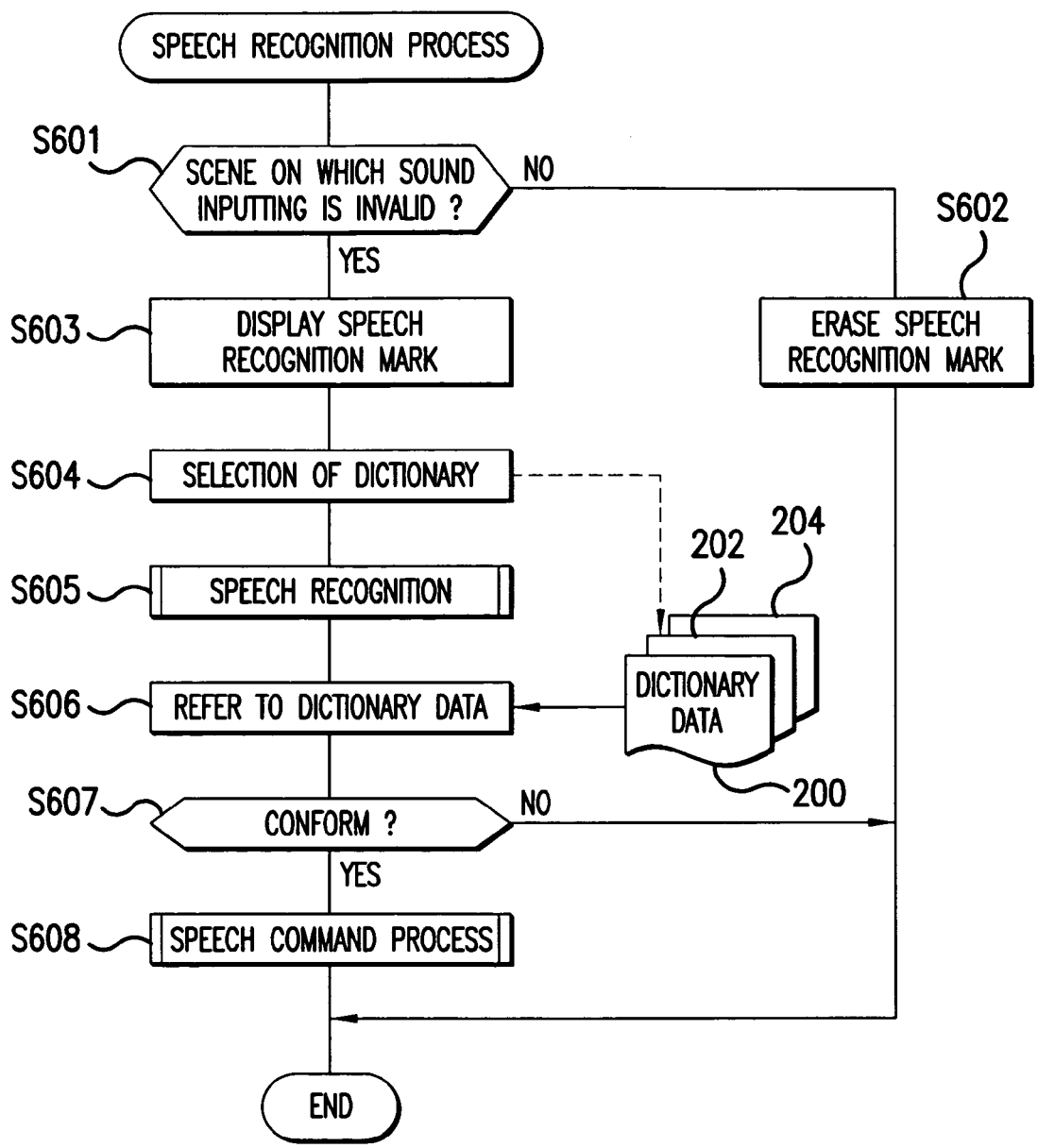
FIG. 27 is a flow chart illustrating contents of a speech recognition process.
Figure 28:
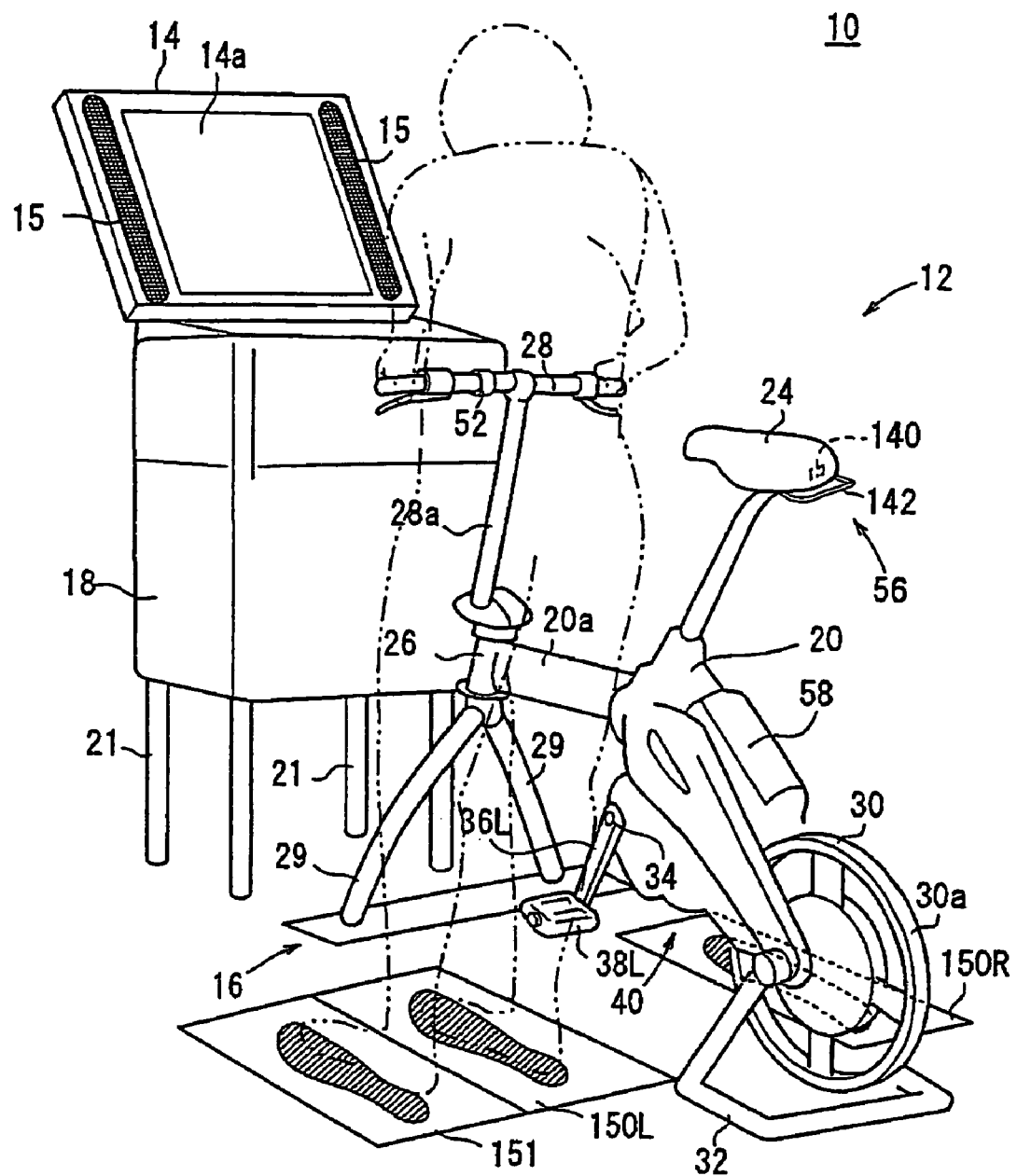
FIG. 28 is a perspective view of a simulation apparatus which includes an additional switch.

Now, the contents of the speech recognition process executed at steps S102, S302, S402 and S502 are described with reference to FIG. 27.

First at step S601, it is confirmed whether or not the situation on the simulated operation is a situation in which sound inputting is valid. If the situation is such that sound inputting is invalid, the processing advances to step S602, but if the situation is such that sound inputting is valid, the processing advances to step S603.

The situation in which sound inputting is valid is, for example, a traveling mode other than the foot landing mode, walking mode, retreating mode and the cornering mode and is a situation wherein the processing load applied to the CPU described hereinabove is comparatively low. On the other hand, the situation in which sound inputting is invalid is, for example, a cornering mode in the traveling mode or the like and is a situation wherein the processing load applied to the CPU is comparatively heavy since the CPU executes such processes as an arithmetic operation of the bank angle $\theta_B$ and a determination of the angles of rotation of the cranks 36L and 36R based on the signals of the left proximity sensor 132L and the right proximity sensor 132R.

Further, the processing load applied to the main control section 18 may be monitored based on a predetermined monitor system or resource meter such that, when the processing load is equal to or higher than a predetermined value, sound inputting is determined invalid.

At step S602, the speech recognition mark 19 on the screen 14a is erased or displayed less indistinctly to indicate that the speech recognition is invalid. After the process at step S602, the processing in the present cycle in the speech recognition process illustrated in FIG. 27 is ended.

On the other hand, at step S603, the speech recognition mark 19 is displayed on the screen 14a so as to indicate that the speech recognition is valid. If the rider observes the speech recognition mark 19, then the rider can readily recognize that the processing by the speech recognition is valid at the current point in time.

Whether sound inputting is valid or invalid may be indicated, for example, by an on/off of lighting of a predetermined lamp. In this instance, the lamp should be provided in the proximity of the monitor 14 or the microphone 52.

At step S604 (dictionary selection section), one of the dictionary data recorded in the storage section 194 is selected. In particular, in any mode other than the traveling mode, the stopping and walking dictionary data 200 is selected, but when the bicycle is in the traveling mode and traveling in a city, the in-city traveling dictionary data 202 is selected. However, when the bicycle is in the traveling mode and traveling in the suburbs, the suburb traveling dictionary data 204 is selected.

Further, if it is determined based on the flag set at step S3 described hereinabove that the rider is a child, then the child dictionary data 200a, 202a or 204a and the common dictionary data 200c, 202c or 204c are selected, but if it is determined that the rider is an adult, then the adult dictionary data 200b, 202b or 204b and the common dictionary data 200c, 202c or 204c are selected.

For example, if the rider is a child and travels in a city, the child dictionary data 202a and the common dictionary data 202c of the in-city traveling dictionary data 202 are selected.

It is to be noted that the selection of dictionary data is performed upon transition of a mode (for example, in the branching process at step S4, S6, S8 or S10 of FIG. 13), and predetermined dictionary data may be loaded from the storage section 194 into the RAM or the like in advance. This makes high-speed accessing to data possible.

At step S605, the speech of the rider inputted from the microphone 52 is analyzed to recognize that the rider has uttered, for example, "right" or "left."

At step S606, the speech of the rider inputted from the microphone 52 at step S605 and dictionary data selected at step S604 are referred to for searching for specify phrase data conforming to the recognized speech.

At step S607, it is recognized by the search process at step S606 described hereinabove whether or not the phrase data exists in the dictionary data. If conforming phrase data exists, then the processing advances to step S608, but if conforming phrase data does not exist, then the processing in the present cycle is ended.

At step S608, a speech command process is performed based on the phrase data conforming to the recognized speech. For example, where the in-city traveling dictionary data 202 is selected and the recognized speech is "left," the common dictionary data 202c (refer to FIG. 12) is referred to, and then the main control section 18 or the sub-control section 58 cooperates with the display control section 184 to cause the screen 14a to display an image estimated to be an image leftwardly of the rider. Further, where the in-city traveling dictionary data 202 is selected and the rider is a child and the speech recognized is "make heavier," the child dictionary data 202a is referred to first, and then the motor 96 is rotated through the sub-control section 58 to tilt the load plate 90 so as to approach the rim 30a and increase the velocity coefficient described hereinabove for calculating the traveling speed V. Furthermore, the value of the transmission gear ratio estimated at the point of time is displayed on the screen 14a. After this process at step S608, the processing in the current cycle of the speech recognition illustrated in FIG. 27 is ended.

In such a speech recognition process as described above, by selecting individual dictionary data in accordance with a mode of traveling and the rider to analyze the speech, the capacity of each individual dictionary data may be small. The processing load when the main control section 18 refers to and searches the dictionary data is light, and high speed processing is possible. Further, the CPU, RAM and so forth of the main control section 18 may be formed from inexpensive devices or devices of a small capacity. Furthermore, since the dictionary data are provided individually corresponding to the modes of traveling and the riders, it is avoided that both of analogous phrase data are present as phrase data to be recorded, and wrong recognition of speech is prevented and the accuracy in recognition is enhanced.

Since the child dictionary data 200a, 202a and 204a and the adult dictionary data 200b, 202b and 204b are provided, a speech command can be executed without an unfamiliar feeling using terms which are generally used by children (for example, a term "make heavier") or terms used by adults (for example, a term "shift-up"), and riders in various age groups can use the simulation apparatus. Since the child dictionary data 200a, 202a and 204a and the adult dictionary data 200b, 202b and 204b are provided separately, such bad effects such as the occurrence of a wrong recognition of speech, a drop of the processing speed and so forth arising from the fact that the system is designed commonly for both children and adults does not occur. Since a bicycle is a vehicle which is ridden not only by a child but also by an adult, such a speech recognition apparatus as described above is particularly effective for the simulation apparatus 10 for a bicycle from among various simulation apparatus. Further, where the dictionary data are divided for different languages such as Japanese and English, a simulation apparatus 10 is effective which is used in various shipment destinations including export destinations.

Further, since the speech recognition process can be stopped under a predetermined situation, the processing load applied to the CPU can be suppressed and the averaging of the load can be anticipated. Accordingly, the capacity of the CPU in a low load condition does not become excessive and the enhancement of the utilization of the CPU can be achieved. In addition, since the speech recognition mark 19 is displayed or not displayed on the screen 14a in response to an operation condition of the speech recognition process, the rider can confirm the operation condition of the speech recognition process at a glance and can issue an instruction at a suitable timing. Consequently, the rider need not pay excessive attention to the timing at which a voice instruction is to be issued. As a result, the operability of the simulation apparatus 10 is enhanced.

It is to be noted that an additional switch 151 similar to the left switch 150L may be provided on the further left side of the left switch 150L such that a simulated walking may be performed by alternately treading the left switch 150L and the additional switch 151 in the walking mode and the retreating mode. This makes it possible for the rider to perform a walking movement and a retreating movement in a posture that is the same as that in the actual pushing and walking mode, which further increases the feeling of presence. In this instance, the rider treads the additional switch 151 with the left foot and treads the left switch 150L with the right foot. Where the simulation apparatus 10 is used in a country in which such pushing and walking is habitually performed on the right side of a two-wheeled vehicle, the additional switch 151 may be provided on the right side of the right switch 150R.

While it is described that the grip detection section 56 is provided at a rear lower portion of the saddle 24, it is only necessary for an operation section corresponding to the grip detection section 56 to be provided at a position at which the rider can easily operate the same when it performs a retreating movement. Thus, the operation section may be provided rearwardly of the saddle 24 like a grip detection section 210 shown in FIG. 29.

The grip detection section 210 is a modification to the grip detection section 56, and includes a retreating switch 212 in the form of a momentary type limit switch provided rearwardly of the saddle 24, a lever 214 for operating the retreating switch 212 on and off, and a bracket 216 serving as a support. By operating a rear operation portion 214a of the lever 214, the lever 214 can be slidably moved resiliently in the forward direction with respect to the bracket 216 while being acted upon by resilient force of a spring 218. When the lever 214 is slidably moved forwardly, a contactor 214b thereon is contacted with the retreating switch 212 to place the retreating switch into an on state. The operation portion 214a extends upwardly from a rear lower portion of the lever 214 to a height substantially equal to that of the rear upper portion of the saddle 24. When the rider gets off the simulated bicycle 12, the rider can touch with the upper face of the saddle 24 and the rear face of the operation portion 214a at a time and operate the lever 214 readily so as to be drawn near. The grip detection section 210 exhibits an effect similar to that of the grip detection section 56.

A vehicle which makes an object of simulated riding on the simulation apparatus 10 may be an airplane, an automobile, a motorcycle or the like. For example, where an airplane is imagined as the vehicle, the function of the speech recognition section 190 can be applied to simulated the conversation between a pilot and an air traffic controller.

The simulation apparatus according to the present invention is not limited to the embodiment described hereinabove but can naturally adopt various configurations without departing from the spirit of the present invention.

The invention being thus described, it will be obvious that the same may be varied in many ways. Such variations are not to be regarded as a departure from the spirit and scope of the invention. All such modifications as would be obvious to one skilled in the art are intended to be included within the scope of the following claims.

What is claimed is:

1. A simulation apparatus, comprising:
   a simulated vehicle operable by a driver;
   a first dictionary phrase data corresponding to a driver with an age less than a first predetermined age;
   at least a second dictionary phrase data corresponding to a driver with an age greater than the first predetermined age;
   a microphone for inputting sound;
   a main control section for controlling operation of the simulated vehicle;
   a speech recognition section for recognizing sound of speech inputted from said microphone based on the age of the driver that is less than the first predetermined age and for selecting said first dictionary phrase data and for recognizing sound of speech inputted from said microphone based on the age of the driver that is greater than the first predetermined age and for selecting said at least second dictionary phrase data; and
   an outputting section being responsive to the selecting of the first dictionary phrase data for performing a first predetermined outputting supplied to said main control section based on the operation and the speech of the driver that is less than the first predetermined age for operating the simulated vehicle, said outputting section being responsive to the selecting of at least the second dictionary phrase data for performing a second predetermined outputting supplied to said main control section based on the operation and the speech of the driver that is greater than the first predetermined age;
   wherein said speech recognition section automatically starts or stops the recognition of speech in response to a situation on simulated driving.

2. The simulation apparatus according to claim 1, wherein said simulation apparatus further includes an indicator for indicating an operational state of said speech recognition section.

3. The simulation apparatus according to claim 1, wherein said simulated vehicle is a simulated bicycle which comprises a pair of cranks each having a pedal at an end thereof and connected to the left and right of a crankshaft, and a handlebar mounted for leftward and rightward pivotal motion.

4. The simulation apparatus according to claim 2, wherein said simulated vehicle is a simulated bicycle which comprises a pair of cranks each having a pedal at an end thereof and connected to the left and right of a crankshaft, and a handlebar mounted for leftward and rightward pivotal motion.

5. The simulation apparatus according to claim 3, and further including a left proximity sensor operatively connected to a left crank and a right proximity sensor operatively connected to a right crank for determining the orientation of the left and right cranks and for generating an output that is displayed on a screen.

6. The simulation apparatus according to claim 1, and further including a retreating switch operatively connected to a seat of the vehicle for being actuated to indicate that the vehicle is being moved in a rearward direction.

7. The simulation apparatus according to claim 1, and further including at least one mat switch for providing a signal that the driver has dismounted from the vehicle and the vehicle is not being operated.

8. The simulation apparatus according to claim 7, wherein the mat switch includes a plurality of longitudinal electrode lines adhered to a rear face of a sheet and transverse electrode lines adhered to a front face of a sheet with an insulating material being disposed therebetween.

9. The simulation apparatus according to claim 1, and further including a sensor operatively mounted to a steering mechanism for the vehicle for providing a signal responsive to a turning of the steering mechanism to the left or to the right for determining a cornering of the vehicle.

10. The simulation apparatus according to claim 9, wherein a warning signal is generated when a bank angle of the vehicle is greater than a predetermined angle for simulating a situation wherein a left or right cranks engages a ground surface occurs.

11. A simulation apparatus comprising:
    a simulated vehicle operable by a driver;
    a first dictionary phrase data including a plurality of phrases that are age appropriate to a driver with an age less than a first predetermined age;
    at least a second dictionary phrase data including a plurality of phrases that are age appropriate to a driver with an age greater than the first predetermined age;
    a microphone for inputting sound;
    a main control section for controlling operation of the simulated vehicle;
    a speech recognition section for recognizing sound of speech inputted from said microphone based on the age of the driver that is less than the first predetermined age and for selecting said first dictionary data and for recognizing sound of speech inputted from said microphone based on the age of the driver that is greater than the first predetermined age and for selecting said at least the second dictionary data; and
    an outputting section being responsive to the selecting of the first dictionary phrase data for performing a first predetermined outputting supplied to said main control section based on the operation and the speech of the driver that is less than the first predetermined age, said outputting section being responsive to the selecting of at least the second dictionary phrase data for performing a second predetermined outputting supplied to said main control section based on the operation and speech of the driver that is greater than the first predetermined age.

12. The simulation apparatus according to claim 11, wherein said simulated vehicle is a simulated bicycle which comprises a pair of cranks each having a pedal at an end thereof and connected to the left and right of a crankshaft, and a handlebar mounted for leftward and rightward pivotal motion.

13. The simulation apparatus according to claim 12, and further including a left proximity sensor operatively connected to a left crank and a right proximity sensor operatively connected to a right crank for determining the orientation of the left and right cranks and for generating an output that is displayed on a screen.

14. The simulation apparatus according to claim 11, and further including a retreating switch operatively connected to a seat of the vehicle for being actuated to indicate that the vehicle is being moved in a rearward direction.

15. The simulation apparatus according to claim 11, and further including at least one mat switch for providing a signal that the driver has dismounted from the vehicle and the vehicle is not being operated.

16. The simulation apparatus according to claim 15, wherein the mat switch includes a plurality of longitudinal electrode lines adhered to a rear face of a sheet and transverse electrode lines adhered to a front face of a sheet with an insulating material being disposed therebetween.

17. The simulation apparatus according to claim 11, and further including a sensor operatively mounted to a steering mechanism for the vehicle for providing a signal responsive to a turning of the steering mechanism to the left or to the right for determining a cornering of the vehicle.

18. The simulation apparatus according to claim 17, wherein a warning signal is generated when a bank angle of the vehicle is greater than a predetermined angle for simulating a situation wherein a left or right cranks engages a ground surface occurs.

* * * * *